US012765474B2

(12) United States Patent
Stark

(10) Patent No.: US 12,765,474 B2
(45) Date of Patent: Oct. 20, 2026

(54) ENERGY-EFFICIENT AND SPACE-SAVING METHOD FOR MANAGING VAPOR PRESSURE DIFFERENCE (VPD) IN MULTILAYERED CONTROLLED ENVIRONMENT AGRICULTURE (CEA) CULTIVATION FACILITY

(71) Applicant: MSP Technology.com LLC, Huntington, NY (US)

(72) Inventor: Walter Stark, Huntington, NY (US)

( * ) Notice: Subject to any disclaimer, the term of this patent is extended or adjusted under 35 U.S.C. 154(b) by 0 days.

(21) Appl. No.: 18/639,274

(22) Filed: Apr. 18, 2024

(65) Prior Publication Data

US 2024/0349660 A1 Oct. 24, 2024

Related U.S. Application Data

(60) Provisional application No. 63/460,217, filed on Apr. 18, 2023.

(51) Int. Cl.
*A01G 9/24* (2006.01)
*A01G 9/18* (2006.01)

(52) U.S. Cl.
CPC ............... *A01G 9/246* (2013.01); *A01G 9/18* (2013.01); *A01G 9/249* (2019.05)

(58) Field of Classification Search
CPC .......... A01G 9/246; A01G 9/249; A01G 9/24; A01G 9/18
See application file for complete search history.

(56) References Cited

U.S. PATENT DOCUMENTS 10,165,734 B1 * 1/2019 Shelor ....................... F24F 11/70
10,624,275 B1 * 4/2020 Lewis .................... A01G 9/247
(Continued)

FOREIGN PATENT DOCUMENTS

AT 390053 B * 3/1990 ............... A01G 9/24
KR 20230039990 A * 3/2023 ............. A01G 9/246
WO WO-2024059130 A1 * 3/2024 ............... A01G 9/24

OTHER PUBLICATIONS

ASABE_ASHRAE_ANSI_Heating, Ventilating-and-Air-Conditioning(HVAC)-for-Indoor-Plant-Enviroments-without-Sunlight_October-2021_33-pages Relevant is the entire document especially discussions of room air at p. 3, section 3.4, p. 19 section 10 (Distribution) and p. 20 section 10.3.2 (Ducts).
(Continued)

*Primary Examiner* — Carly W. Lynch
(74) *Attorney, Agent, or Firm* — Robert Brownstein

(57) ABSTRACT

An energy-efficient and space-saving apparatus, arrangement, and method for managing vapor pressure difference in multilayered controlled-environment agriculture cultivation facilities includes a heating, ventilating, air conditioning, and dehumidification (HVACD) system. The HVACD system precisely controls temperature, humidity, and room vapor pressure of delivered air. The resulting air flow is also delivered locally, being directed downward and substantially perpendicular toward the canopy of the plants being cultivated. Speakers and/or vibration generators are also used to direct sounds and/or vibrations locally onto the canopy of the plants being cultivated, to break up the boundary layer on the surfaces of the leaves, to aid in the release of heat and humidity from the surfaces of the leaves into the surrounding air, for processing by the temperature and humidity control system.

34 Claims, 19 Drawing Sheets

(56) References Cited

U.S. PATENT DOCUMENTS

| | | | | |
|---|---|---|---|---|
| 10,694,682 | B2 | 6/2020 | Bogner et al. | |
| 10,806,099 | B2 | 10/2020 | Bogner et al. | |
| 11,212,969 | B1 * | 1/2022 | Baras | A01G 9/24 |
| 11,627,704 | B2 * | 4/2023 | Lys | G01N 33/0098 362/231 |
| 11,632,915 | B2 | 4/2023 | Bogner et al. | |
| 11,641,810 | B2 | 5/2023 | Bogner et al. | |
| 12,041,898 | B2 * | 7/2024 | Romine | A01G 9/023 |
| 2010/0320277 | A1 * | 12/2010 | Stark | F24F 11/77 236/1 B |
| 2015/0282440 | A1 * | 10/2015 | Shelor | A01G 9/246 47/17 |
| 2018/0206416 | A1 * | 7/2018 | Zimmerman | A01G 9/18 |
| 2018/0288949 | A1 * | 10/2018 | Glaser | A01G 9/24 |
| 2019/0059242 | A1 * | 2/2019 | Bogner | A01G 9/246 |
| 2019/0133052 | A1 * | 5/2019 | Carson | A01G 7/02 |
| 2019/0223386 | A1 * | 7/2019 | Limpert | F21V 33/0056 |
| 2021/0315169 | A1 * | 10/2021 | Thomas | A01G 9/24 |
| 2021/0352853 | A1 * | 11/2021 | Day | F24F 11/65 |
| 2022/0192105 | A1 * | 6/2022 | Misner | A01G 9/246 |
| 2022/0240458 | A1 * | 8/2022 | Breza | A01G 7/045 |
| 2023/0073284 | A1 * | 3/2023 | Hernandez | A01G 9/24 |
| 2023/0180687 | A1 * | 6/2023 | Fu | A01G 9/18 47/62 A |

OTHER PUBLICATIONS

Screenshot of AmplifiedAg "AmpNFT" YouTube video. https://www.youtube.com/watch?v=3TITYT5PwmE. Feb. 15, 2023. 1 page.

Screenshot of SouthCarolinaETV "Vertical Roots Farm" YouTube video—horizontal fans. https://www.youtube.com/watch?v=jKY6OOrcwic. Nov. 12, 2019. 1 page.

Screenshot of SouthCarolinaETV "Vertical Roots Farm" YouTube video - with plants and horizontal fans. https://www.youtube.com/watch?v=jKY6OOrcwic. Nov. 12, 2019. 1 page.

VivoSun—2022 reddot winner. 2-in-1 Grow Light. https://vivosun.com/vivosun-aerolight-100w-led-grow-light-with-integrated-circulation-fan-samsung-lm301-diodes-compatible-with-growhub-controller-app-p90271565918111670-v90271565918111660. 1 page.

FabricAir_Ducting_74-page_website_catalog_2024.

FabricAir_Air-Distribution-Solutions-For-Happy-Plants_8-page_website_advertisement_2024.

FabricAir_Complete-Air-Solutions-For-Grow-Facilities_7-page_website_advertisement_2024.

FabricAir_Rack-Flow-System_5-page_website_advertisement_2013.

* cited by examiner

SHOWING HVACD COUPLED TO CANOPY VENTILATION

FULL LENGTH VIEW

SHOWING HVACD DECOUPLED FROM CANOPY VENTILATION

FULL LENGTH VIEW

SHOWING HVACD COUPLED TO CANOPY VENTILATION

FULL LENGTH VIEW

SHOWING HVACD DECOUPLED FROM CANOPY VENTILATION

FULL LENGTH VIEW

SHOWING HVACD COUPLED TO CANOPY VENTILATION

FULL WIDTH (ROW) VIEW

SHOWING HVACD COUPLED TO CANOPY VENTILATION

CUTAWAY SECTIONAL LENGTH VIEW

SHOWING HVACD COUPLED TO CANOPY VENTILATION

CUTAWAY SECTIONAL WIDTH (ROW) VIEW

SHOWING HVACD COUPLED TO CANOPY VENTILATION

SHOWING HVACD COUPLED TO CANOPY VENTILATION

SHOWING HVACD DECOUPLED FROM CANOPY VENTILATION

SHOWING HVACD DECOUPLED FROM CANOPY VENTILATION

ENERGY-EFFICIENT AND SPACE-SAVING METHOD FOR MANAGING VAPOR PRESSURE DIFFERENCE (VPD) IN MULTILAYERED CONTROLLED ENVIRONMENT AGRICULTURE (CEA) CULTIVATION FACILITY

CROSS-REFERENCES TO RELATED APPLICATION

This application claims benefit in part under 35 U.S.C. § 119 (e) from provisional application No. 63/460,217, filed Apr. 18, 2023, the disclosures of which are incorporated herein by reference.

FIELD OF THE INVENTION

The disclosures herein relate to an energy-efficient and space-saving arrangement, apparatus, and method for managing vapor pressure difference (VPD) in a multilayered controlled environment agriculture (CEA) cultivation facility, providing uniform airflow with multiple small air-moving devices or air delivery terminus having perpendicular airflow relative to the plant's canopy. Regarding light waves and airflow, the term perpendicular and parallel may be considered "substantially" perpendicular or parallel.

BACKGROUND OF THE INVENTION

Plant cultivation through the use of a Controlled Environment Agriculture (CEA) is a rapidly growing industry worldwide.

Plant life depends on 1) A suitable climate and water with nutrients, 2) Carbon dioxide ($CO_2$), and 3) Photosynthesis for growth.

1) Suitable Climate and Water with Nutrients:

The most critical component of a suitable cultivating climate, and a primary driver of crop quality, is the vapor pressure difference (VPD). VPD is the force that moves water, with nutrients, through a plant. It is calculated by subtracting the room vapor pressure (VP) (VP of the air surrounding the plants) from the plant VP.

The room VP is a function of the temperature and humidity established by the cultivator. The Heating, Ventilating, Air Conditioning, and Dehumidification (HVACD) system precisely controls the temperature, humidity, and room VP.

In general, when made with reference to a forest of trees, the term "canopy" refers to the branches and leaves that spread out at the top of the tree. As utilized herein, the term "canopy" refers to the region above the roots and surrounding the leaves of the plants in the CEA and even the leaves themselves. The plant VP is a function of lighting intensity and airflow velocity and temperature over the plant leaves. Since light intensity is typically a fixed value, the only remaining variables are airflow velocity and temperature, which are directly associated with VPD. The plant leaves and canopy need uniform airflow and uniform temperature to prevent hot spots and support the uniform VPD designed for the crop. For plants to thrive in their natural environment, sun, rain and soil nutrients are needed. But wind plays a critical role in sustaining plants. Wind removes a plant's waste products—oxygen and water vapor—cools the leaves' surface from the radiant heat delivered with sunlight, and supplies $CO_2$ and some $O_2$.

In nature, plants grow on a single layer and the wind blows substantially parallel to the earth's surface, and from a powerful and unpredictable source. A light breeze has an airspeed of 300-600 f/m. Reproducing this air velocity in even a single layer is impractical, as it would require an abnormally large and impractical amount of air moving apparatus.

Researchers conducted a CFD analysis of airflow uniformity in a Shipping-Container vertical farm, using average velocities ranging from 43 to 199 f/m (0.22 to 1.01 m/s). Resource Innovation Institute suggests "many experts recommend an air velocity of 60 to 100 f/m (0.3-0.5 m/s) to remove the saturated vapor of the leaf boundary layer". Otherwise, the CEA community offers little definitive advice regarding the air velocity needed in the canopy. It may depend on the type of plants and the environmental conditions. Therefore, we will assume it is desirable to maintain an average air velocity of 80 f/m (0.41 m/s) and can adjust this value as more information becomes available. This velocity translates to 80 $ft^3/m/ft^2$ of canopy. In comparison, and to demonstrate an order of magnitude, the temperature and humidity control (HVACD) system in a typical CEA facility typically requires airflow of less than 4 $ft^3/m/ft^2$ of canopy area.

An efficient way to achieve sufficient air volume to the canopy is by using air amplifiers that use a primary airflow that locally induces another airflow. Assuming an amplified air induction ration of 10:1, only 8 $ft^3/m/ft^2$ of primary air is needed to generate 80 $ft^3/m/ft^2$ of total. With high induction ratios, mixing air from the HVACD system with canopy air is possible because the air temperature delivered at the plants is much higher than the lowest air temperature delivered from the HVACD system. Further, this arrangement can cause significant savings in the cost of installation and operation.

Restricted room for ductwork makes smaller high-velocity and high-pressure ducting system connected to air amplifiers, a viable alternative to large low velocity and low-pressure ducting. High pressure air connected to air amplifiers may carry as little as 4% of the total required air volume. The air amplifier can make up the difference with local canopy air.

There is clear evidence showing that vibration applied to heat exchangers will enhance heat transfer by disrupting the boundary layer. A boundary layer also exists on plant leaves, and it is reasonable to assume that vibration will also help disrupt this boundary layer and improve heat transfer.

2) Carbon Dioxide ($CO_2$):

Plants expel oxygen and take in $CO_2$. Therefore, $CO_2$ gas is essential for plant growth and requires monitoring and replenishment as needed. However, $CO_2$ makes up only 0.04% of our atmosphere, or about 420 ppm, and cultivators require up to 1,500 ppm at times to help produce superior crops.

3) Photosynthesis:

Photosynthesis is the process used by plants and other organisms to convert light energy into chemical energy through cellular respiration, which energy is later released to fuel the organism's activities. Chemical energy, stored in carbohydrate molecules such as sugars and starches, uses water and carbon dioxide to synthesize. In a CEA facility, lights directed at the plants activate photosynthesis.

The open space between the lighting and plants cannot contain objects that could cast shadows or interfere with light that triggers photosynthesis. Light waves heat objects in their path. In CEA facilities, light waves that land primarily on plant leaves, may potentially create hot spots that the canopy ventilation system is designed to prevent.

In a multilayer and multirow cultivation facility, the space immediately above the lighting begins a new layer of plants, followed by another layer of lights, which arrangement is repeated up to the final layer. Efficient use of space in a CEA facility requires the maximum number of plants per cubic foot. Therefore, space for aisles and utilities such as electric cables, water pipes, and air ducts needs to be minimized. Air ducts are of particular concern due to their size. Typically, airflow is through low-pressure air ducts that are too large to fit through the structural members supporting the layers and rows of plants. The ducts weave through the restricted area with sharp turns and pinching, resulting in restricted airflow and excessive pressure drop. Airflow reaching the canopy is parallel to the plants and canopy (see e.g., prior art FIG. 1 and FIG. 2), which is much less effective than creation of an effective perpendicular airflow, as is achieved in the herein disclosed arrangement/facility (see e.g., FIG. 4 and FIG. 5). The result of prior art arrangements is a compromised design because the ducts are too large to fit in the provided space. Delivering air to the canopy using an arrangement that requires large ducts utilizes valuable space that could contain additional plants. As a result, aisles are narrow, with little room for air ducts without decreasing the cultivating area. The present invention solves this by bringing the source of airflow in close proximity to, and being directed perpendicular with respect to, the canopy.

Low-pressure ducts must serve multiple plant assemblies and require significant space to route. It is easy to see the difficulty in routing large ducts through the maze of plant assemblies especially considering that the zone between lights and plants is off-limits.

Managing cultivation room climate, nutrients, $CO_2$, and photosynthesis has tended to receive considerable attention. However, controlling the plant's vapor pressure difference (VPD) tends to succumb to amateur judgment and trial and error. HVAC equipment currently designed for CEA facilities has high dewpoint supply temperatures, resulting in excessive air volumes that do not serve the VPD issue. There are attempts to weave ductwork through tight support structures in a multi-layer/multi-row facility. Fans are haphazardly located, attempting to create sufficient air flow, much of which has no effect. Controlling VPD in these systems is problematic because it involves a mixture of art and science.

Parallel Airflow:

Parallel airflow, relative to the canopy, has typically been utilized for moving air in a cultivation room (see e.g., prior art FIG. 1 and FIG. 2). However, airflow parallel to the canopy is only very effective where the edge of the air mass initially meets the canopy. Above the canopy, the airflow serves no purpose, and its velocity also diminishes as it moves further from the source, further reducing the effectiveness of the parallel airflow arrangement. Therefore, most of the parallel airflow arrangement represents wasted energy.

Air Entrainment:

Airflow leaving a terminus will entrain a secondary airflow. In traditional HVAC applications, the velocity of air leaving a terminus will entrain a secondary airflow is about equal to the terminus airflow, providing an entrainment ratio of 1:1. However, as the terminus airflow velocity increases, so does the entrainment ratio.

Air Induction:

Airflow amplifiers or multipliers rely on a high velocity air jet to induce another airstream much the same as air entrainment, but with higher velocity resulting in a significantly higher induction ratios compared with air entrainment ratios. With high primary air velocities, the combined induction and entrainment ratios can reach 25:1. This means that a low volume of high velocity primary air can entrain a significantly higher volume of secondary air. This can result in small air ducts with low primary air volume, capable of generating significant secondary air volume in the canopy.

Canopy Purge:

Primary air entering the canopy creates a pressure that forces an equal volume of air from the canopy and into the surrounding environment for processing by the humidity and temperature control equipment.

Secondary air (entrained or inducted) is recirculated within the canopy and does not help the purging process. Therefore, it is necessary to introduce sufficient primary air in an effective manner to purge the canopy of high temperature and high humidity air, and plant gas, which is accomplished by the herein disclosed CEA facility.

The herein disclosed apparatus, arrangement, and method of use provides improvements upon prior art systems.

SUMMARY OF THE INVENTION

This summary is provided to introduce a selection of concepts in a simplified form that are further described below in the Detailed Description. This Summary is not intended to identify key features or essential features of the claimed subject matter, nor is it intended to be used to limit the scope of the claimed subject matter.

The present invention addresses the issue of precise control of VPD, which has received little attention in the CEA industry, but is, nevertheless, critical in the cultivation environment. Current systems designed to promote airflow and VPD have been haphazard due to the difficulty of getting uniform airflow to the plants.

The herein disclosed configuration for a CEA facility emphasizes space efficiency and enables filling the allotted space with the maximum number of plants, which typically will be organized to have multiple layers and multiple rows of plants. The distance between layers is minimized to optimize the room height. The distance between rows is also minimized for optimal use of the room width and length. Irrigation pipes and electric power lines for lighting are small and easily routed through the structure. In the prior art CEA facilities, achieving adequate airflow was attempted through the introduction of air flowing over the canopy, and is usually an afterthought. In the herein disclosed CEA facility, the airflow originates from centralized fans and is delivered through ducts that weave through the structure, to achieve airflow throughout and within the canopy, which is minimally assisted by airflow through the HVACD system, whose primary purpose is to control humidity and temperature. The herein disclosed design utilizes a novel configuration for air flow ducts, permitting greater airflow that is strategically directed towards the plants being cultivated by the CEA facility, enabling improved results.

One concept of this invention is to promote uniform air movement over the plants and canopy by placing the airflow source close to the point of use. As a result, energy is saved by eliminating the ductwork pressure drop. Further, airflow perpendicular to the plants and the canopy is significantly more effective than random airflow parallel to the plants and canopy. In addition, each plant's exposure to air, water, nutrients, light, and $CO_2$ is provided in uniform proportions in the herein disclosed CEA facility to ensure the crop development is uniform. But it is noted that uniformity can differ between the growth stages. For example, early-stage plants entering the process should receive uniform and equal exposure to all elements, while grown plants, leaving the process at harvest-stage should also receive uniform exposure, but exposure can differ between growth stages.

Perpendicular Airflow:

The basic concept of this invention is to optimize VPD, and conserve space, in an energy-efficient manner by bringing the source of airflow close to the canopy and delivering it perpendicular to the canopy.

Air movement directed towards the plants is essential. Delivering air in a structurally dense environment where nothing can interfere with the light waves serving the plants is difficult. Generating air movement as close to the plants as possible and delivering this air perpendicular to the plant canopy ensures it is most effective.

The disclosed apparatus and arrangement and method of use provide local air-moving devices that create perpendicular airflow relative to the plant canopy to better meet the canopy airflow needs.

The herein disclosed apparatus and arrangement and method of use operate to maintain VPD, in a tight space, with low energy consumption.

The herein disclosed apparatus and method for managing vapor pressure difference (VPD) in an improved multilayered controlled environment agricultural facility, including plants and irrigation tray assemblies. The section above the roots and surrounding the plant leaves is the "canopy." The light waves from multiple light sources are directed perpendicular to said plant and irrigation tray assemblies; and multiple air terminus are mingled with the light sources for directing airflow perpendicular toward the plant and tray assemblies.

The apparatus may include electrically powered multiple muffin fans strategically positioned between the light sources. The light sources may comprise light bars or individual light bulbs, but light-emitting diodes (LEDs) and/or other fiber optic light sources are more preferably used.

Air amplifiers are driven by a primary air source delivered through conduits that induce a secondary airflow directed perpendicular to said plant and irrigation tray assemblies. These air amplifiers are preferably located between adjacent light bars.

A separate conduit may also be utilized to feed a measured supply of $CO_2$ from its contained source to the primary air supplying the terminus, where an air/$CO_2$ mixture is directed substantially downward to the canopy. By "directed downward," it means that the airflow is perpendicular to the plant trays holding the plants, as further discussed hereinafter. As a result, the air amplifiers generate up to twenty-five times the airflow volume of the high-pressure air or compressed air input to the plants.

In a preferred embodiment, a controlled environment agricultural (CEA) facility includes:

a) a plurality of tray assemblies each configured to hold one or more plants to be cultivated;

b) wherein at least a portion of said plurality of tray assemblies are arranged to form a first layer configured to extend in a first linear direction;

c) wherein a second portion of said plurality of tray assemblies are formed into a plurality of layers, being spaced apart in the vertical direction and positioned above said first layer;

d) a plurality of light sources positioned directly above each of said plurality of tray assemblies, being configured to illuminate the plants in said plurality of tray assemblies;

e) a primary air duct for said first layer and for each of said plurality of additional layers;

f) wherein each said primary air duct comprises: a plurality of distributed openings configured to direct air substantially perpendicularly towards the plants in said plurality of tray assemblies;

g) an air conditioning system, said air conditioning system configured to alter temperature and humidity of air received therein to create conditioned air a desired temperature and a desired humidity level to compensate for losses and gains in temperature and humidity caused by lighting, and transpiration;

h) at least one air mover, said air mover configured to create an airflow rate suitable to ventilate the entire canopy using any combination of air from the air conditioning system and room that equals the airflow rate for ventilating the canopy;

j) wherein said plurality of distributed openings in each said primary air duct are intermingled with said plurality of light sources in two dimensions being with respect to said first linear direction and a second linear direction, said second linear direction being perpendicular to said first linear direction.

DETAILED DESCRIPTION OF THE INVENTION

Figure 1:
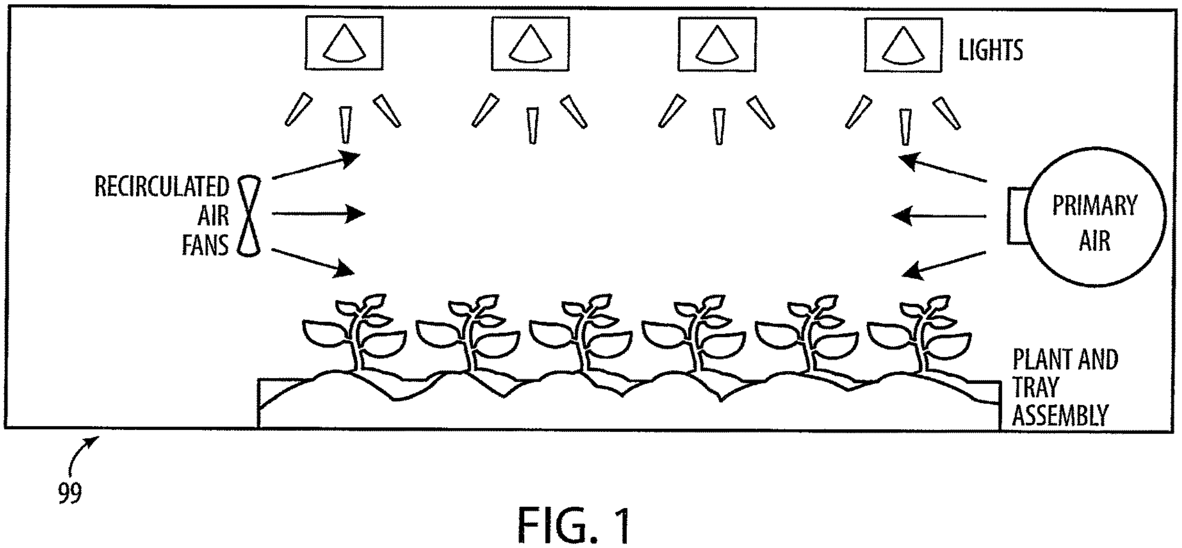
FIG. 1 (Prior Art)
FIG. 1 shows a prior art plant, irrigation, and lighting assembly with two different prior art airflow methods for delivering airflow parallel to the plants and canopy.

As used throughout this specification, the word "may" is used in a permissive sense (i.e., meaning having the potential to, or being optional), rather than a mandatory sense (i.e., meaning must), as more than one embodiment of the invention may be disclosed herein. Similarly, the words "include", "including", and "includes" mean including but not limited to.

The phrases "at least one", "one or more", and "and/or" may be open-ended expressions that are both conjunctive and disjunctive in operation. For example, each of the expressions "at least one of A, B and C", "one or more of A, B, and C", and "A, B, and/or C" herein means all of the following possible combinations: A alone; or B alone; or C alone; or A and B together; or A and C together; or B and C together; or A, B and C together.

Also, the disclosures of all patents, published patent applications, and non-patent literature cited within this document are incorporated herein in their entirety by reference. However, it is noted that the citing of any reference within this disclosure, i.e., any patents, published patent applications, and non-patent literature, is not an admission regarding a determination as to its availability as prior art with respect to the herein disclosed and claimed apparatus/method.

Furthermore, any reference made throughout this specification to "one embodiment" or "an embodiment" means that a particular feature, structure or characteristic described in connection therewith is included in at least that one particular embodiment. Thus, the appearances of the phrases "in one embodiment" or "in an embodiment" in various places throughout this specification are not necessarily all referring to the same embodiment. Therefore, the described features, advantages, and characteristics of any particular aspect of an embodiment disclosed herein may be combined in any suitable manner with any of the other embodiments disclosed herein.

Additionally, any approximating language, as used herein throughout the specification and claims, may be applied to modify any quantitative or qualitative representation that could permissibly vary without resulting in a change in the basic function to which it is related. Accordingly, a value or recitation modified by a term such as "about" is not to be limited to the precise theoretical characteristic or value specified, and may include values that differ from the specified value in accordance with design variations that may be described in the specification, as well as applicable case law. Also, in at least some instances, a numerical difference provided by the approximating language may correspond to the precision of an instrument that may be used for measuring the value or characteristic. A numerical difference provided by the approximating language may also correspond to a manufacturing tolerance associated with production of the aspect/feature being quantified/described (see e.g., *Ex Parte Ollmar*, Appeal No. 2014-006128 (PTAB 2016)). Furthermore, a numerical difference provided by the approximating language may also correspond to an overall tolerance for the aspect/feature that may be derived from variations resulting from a stack up (i.e., the sum) of a multiplicity of such individual tolerances.

Similarly, the term "substantially" means that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

FIG. 1 shows a prior art plant, irrigation, and lighting assembly 99 with two different prior art airflow methods for delivering airflow parallel to the plants and the canopy, one being a bladed fan that supplies recirculated canopy air, and the second being an air outlet supplying primary air parallel to the canopy.

Figure 2:
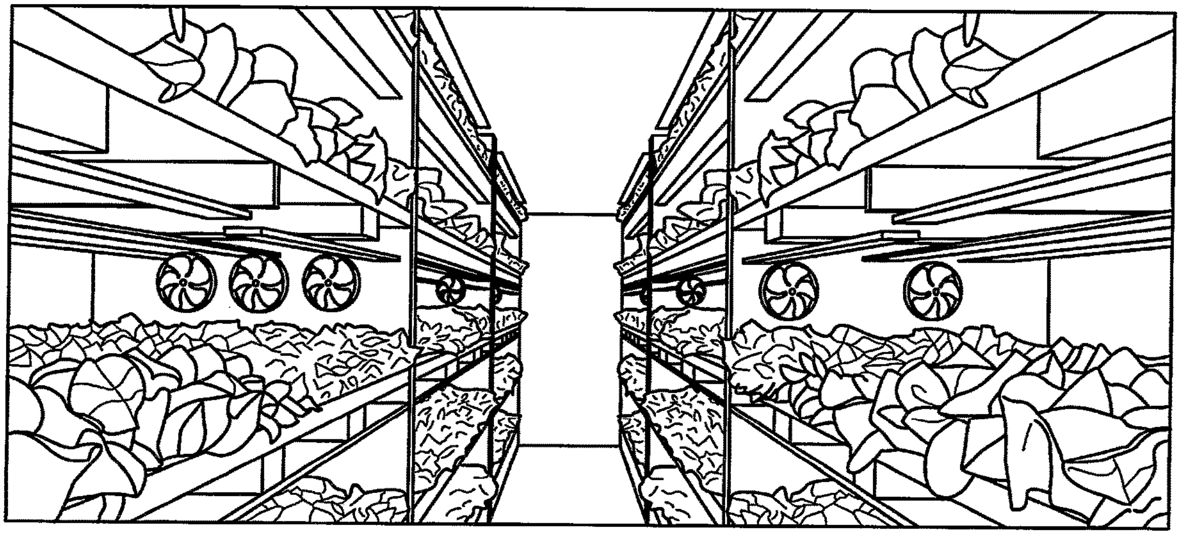
FIG. 2 (Prior Art)
FIG. 2 is a photo of a typical prior art cultivation space where airflow is delivered parallel to the plants and canopy.

FIG. 2 is an illustration of a typical prior art cultivation space in which airflow is delivered parallel to the plants and canopy (see e.g., U.S. Pat. No. 10,104,846 to Lepp). For both prior art airflow methods, air is directed substantially parallel to the canopy, where much of the turbulence occurs over the canopy which cannot disrupt the boundary layer on the plant leaves.

Figure 3:
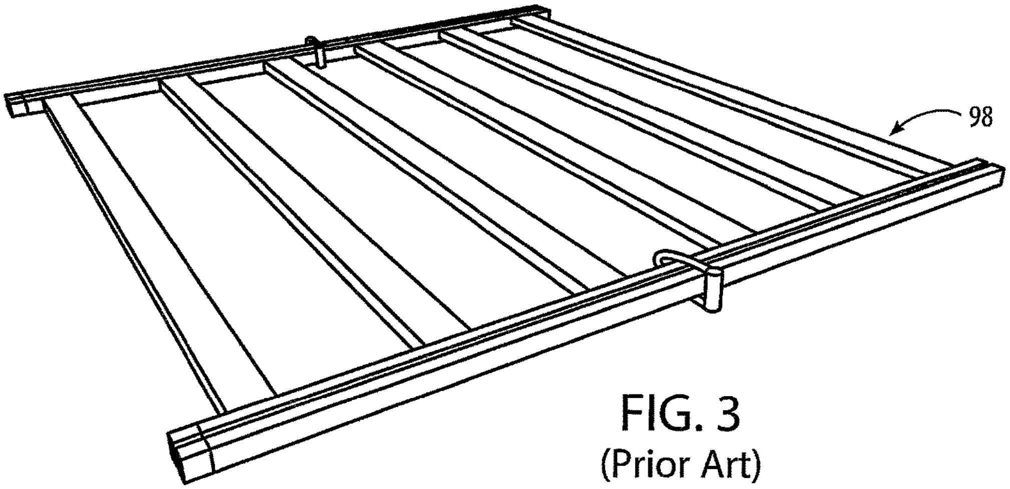
FIG. 3 (Prior Art)
FIG. 3 is a perspective view of an LED cultivation light fixture with bars containing LED lights, which may have been oriented parallel to the width or length of the prior art cultivation room.

FIG. 3 illustrates a typical rack of LED light bars that provide light waves perpendicular to the canopy.

Figure 4:
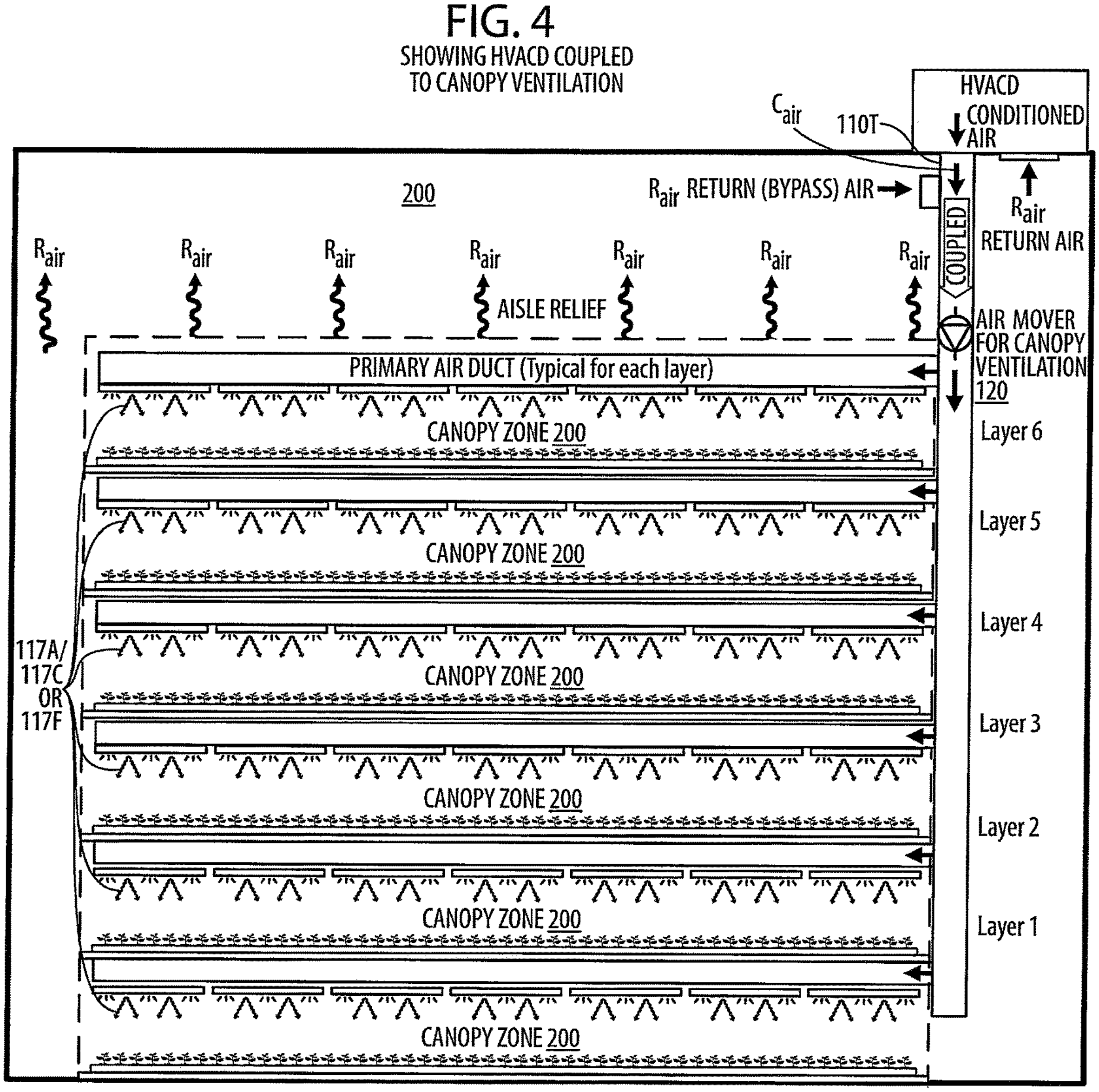
FIG. 4 is an elevation view showing a lengthwise arrangement for a cultivation room, as disclosed herein, having multiple cultivation layers, and particularly arranged ducts and air delivery to the plants of each tray.
Figure 5:
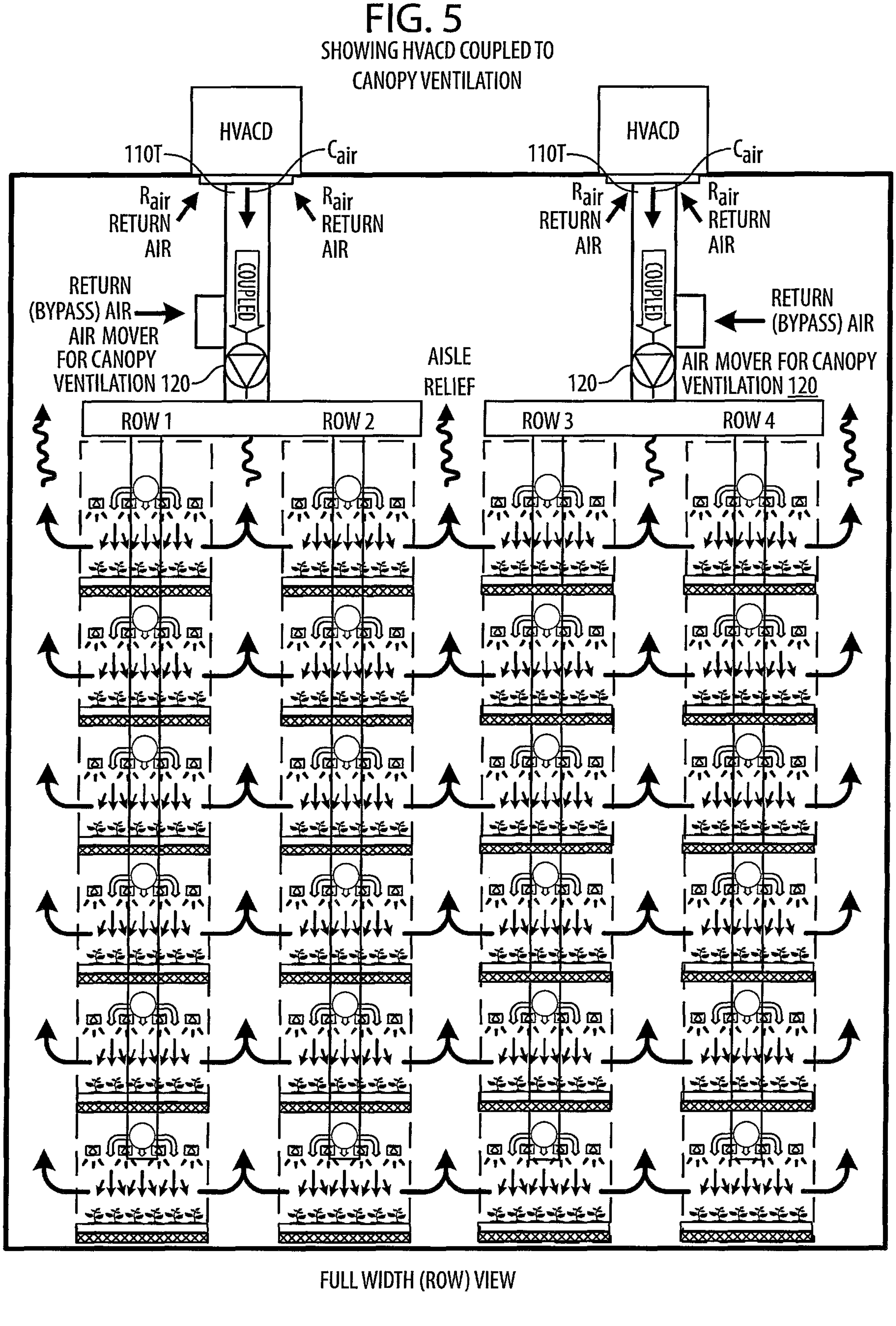
FIG. 5 is an elevation view showing a widthwise arrangement for a cultivation room as disclosed herein, in which the multiple cultivation layers shown in FIG. 4 are furthermore arranged into multiple cultivation rows.

The herein disclosed multilayered controlled environment agricultural facility 100 may be seen in FIG. 4 and FIG. 5, which overcomes the issues of the prior art.

Plant leaves have a specific vapor pressure that is determined using the leaves surface temperature and relative humidity within a thin "boundary layer" on the leaves surface. Plants are transpiring continuously, and therefore the relative humidity in the boundary layer may always be 100%.

However, the leaf surface temperatures may also vary with light intensity and air turbulence. Uniform air turbulence on the canopy leaf surfaces may be a function of the canopy ventilation system 200.

The multilayered controlled environment agricultural facility 100 may have a specific vapor pressure that is determined from the temperature and relative humidity of the room, which are selected by the cultivator and becomes a key ingredient in their "recipe" for the plants being cultivated.

The difference between the plant and room vapor pressures is the vapor pressure difference (better known as the vapor pressure deficit or VPD) which is also selected by the cultivator and becomes a key ingredient in their "recipe." With uniform canopy ventilation, the leaf vapor pressures, and vapor pressure deficit (VPD) are also uniform.

Therefore, the airflow generated by the canopy ventilation system 200 has two functions. First, to break up the boundary layer and provide uniform air turbulence on the plant leaves. Second to purge the heat and humidity produced as radiant heat and transpiration originating from the plants using.

Figure 4A:
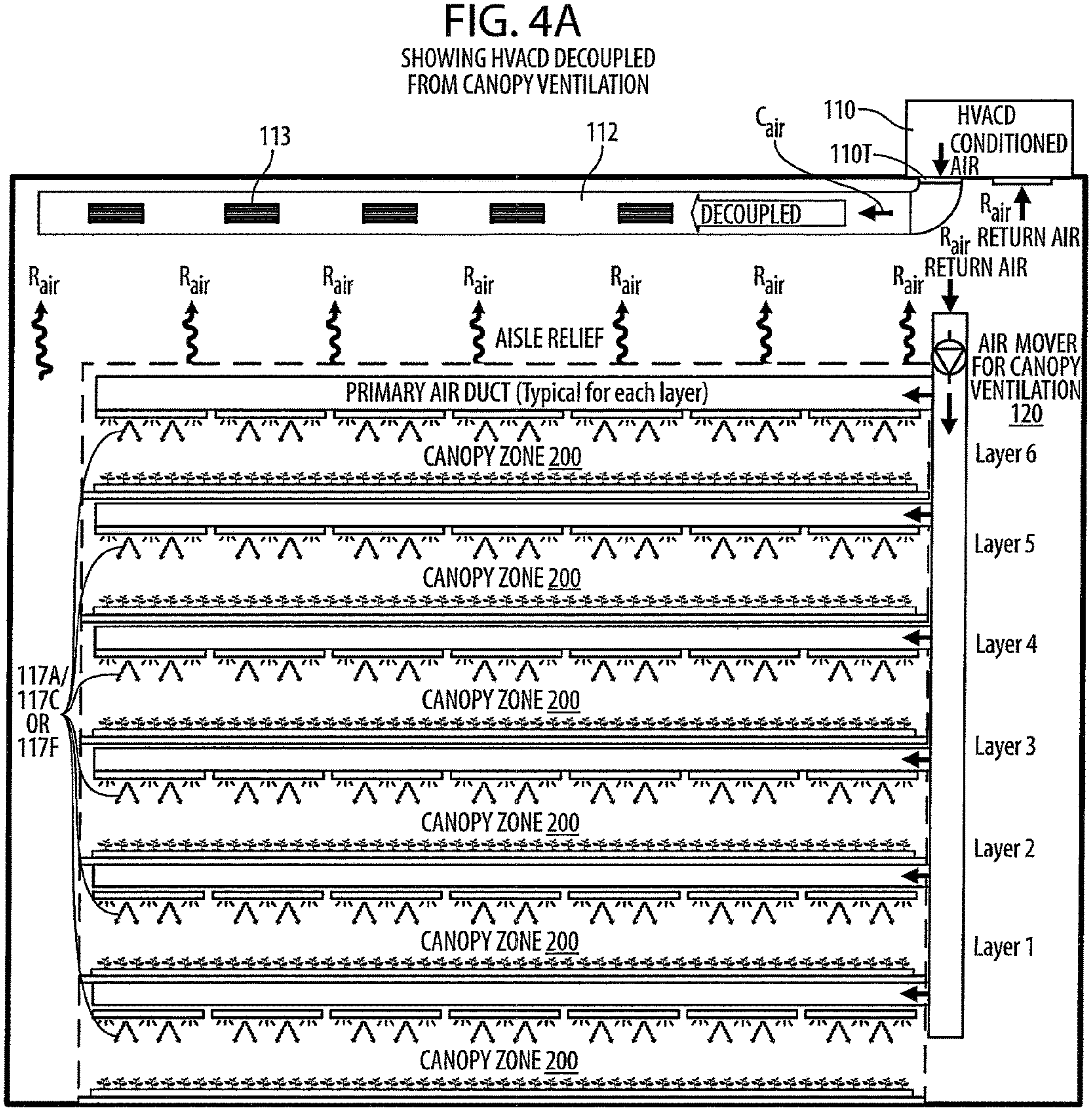
FIG. 4A is an alternate embodiment of the system of FIG. 4, in which conditioned air from HVACD system is also delivered by a duct located toward the top of the room, to cool, heat or dehumidify the room air.

FIG. 4 is an elevation view showing a first embodiment of a lengthwise arrangement for the agricultural facility 100, having multiple cultivation layers. Merely to be exemplary, FIG. 4 shows six layers (i.e., Layer 1, Layer 2, Layer 3, Layer 4, Layer 5, and Layer 6). However, it is to be understood that other numbers of layers may be utilized, which may also be formed in accordance with the structural arrangement described hereinafter. In another embodiment, shown in FIG. 4A, a duct 112 having a plurality of opening 113 may be used to deliver a supply of conditioned air directly from the HVACD 110 to the cultivation room, using a separately designed air distribution system for overall cooling of the room. FIG. 4A also shows the alternate embodiment of the system of FIG. 4, in which conditioned air from HVACD system is also delivered by a duct located toward the top of the room, to cool the entire room.

Figure 4B:
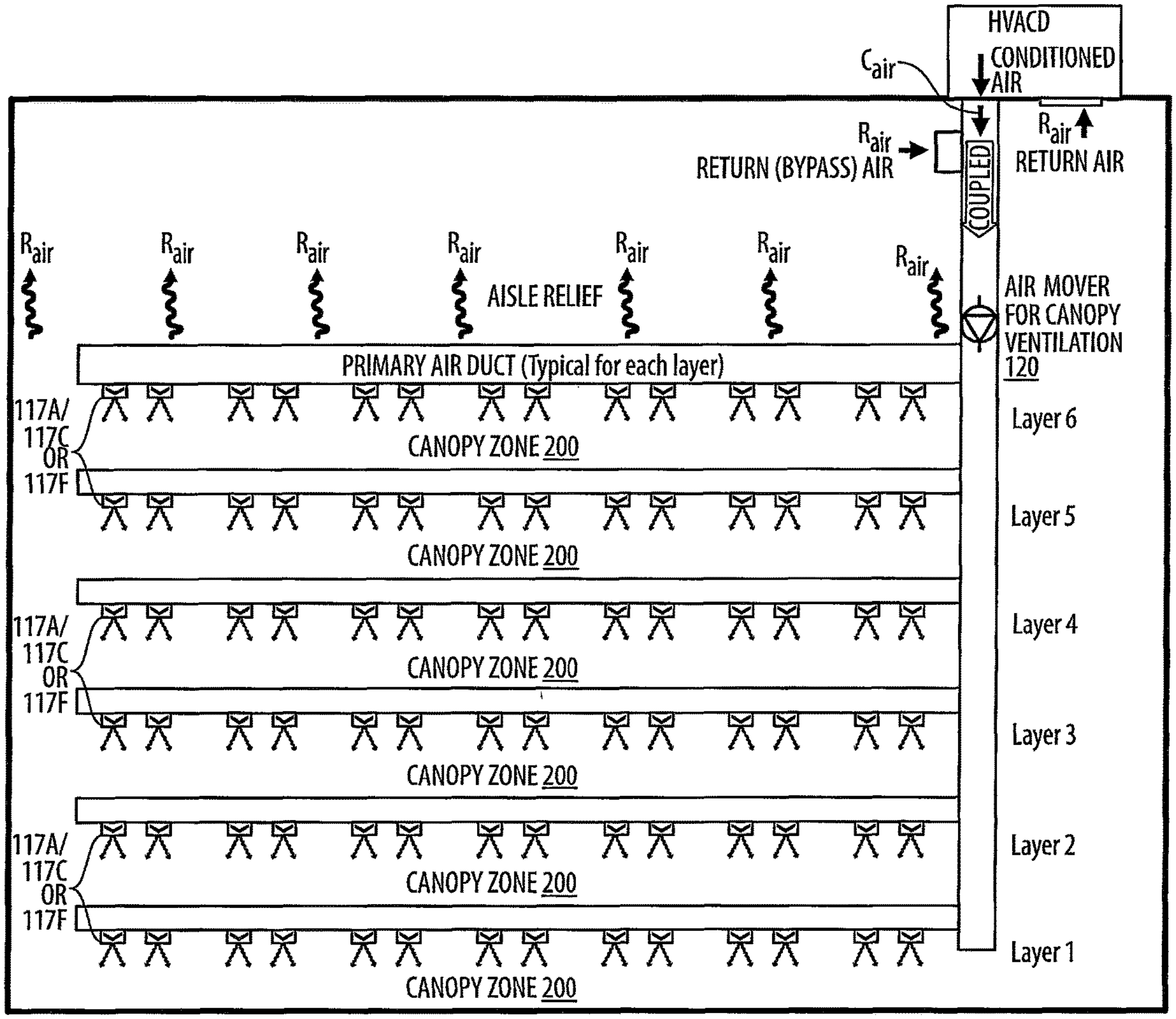
FIG. 4B is a diagrammatic view of the embodiment shown in FIG. 4, showing only the canopy ventilation system, coupled with the HVACD system, with lighting, plants and other details outside to canopy ventilation system, omitted.

For simplicity. FIG. 4B is a diagrammatic view of the embodiment shown in FIG. 4, showing only the canopy ventilation system, coupled with the HVACD system, with lighting, plants and other details outside to canopy ventilation system, omitted.

Figure 4C:
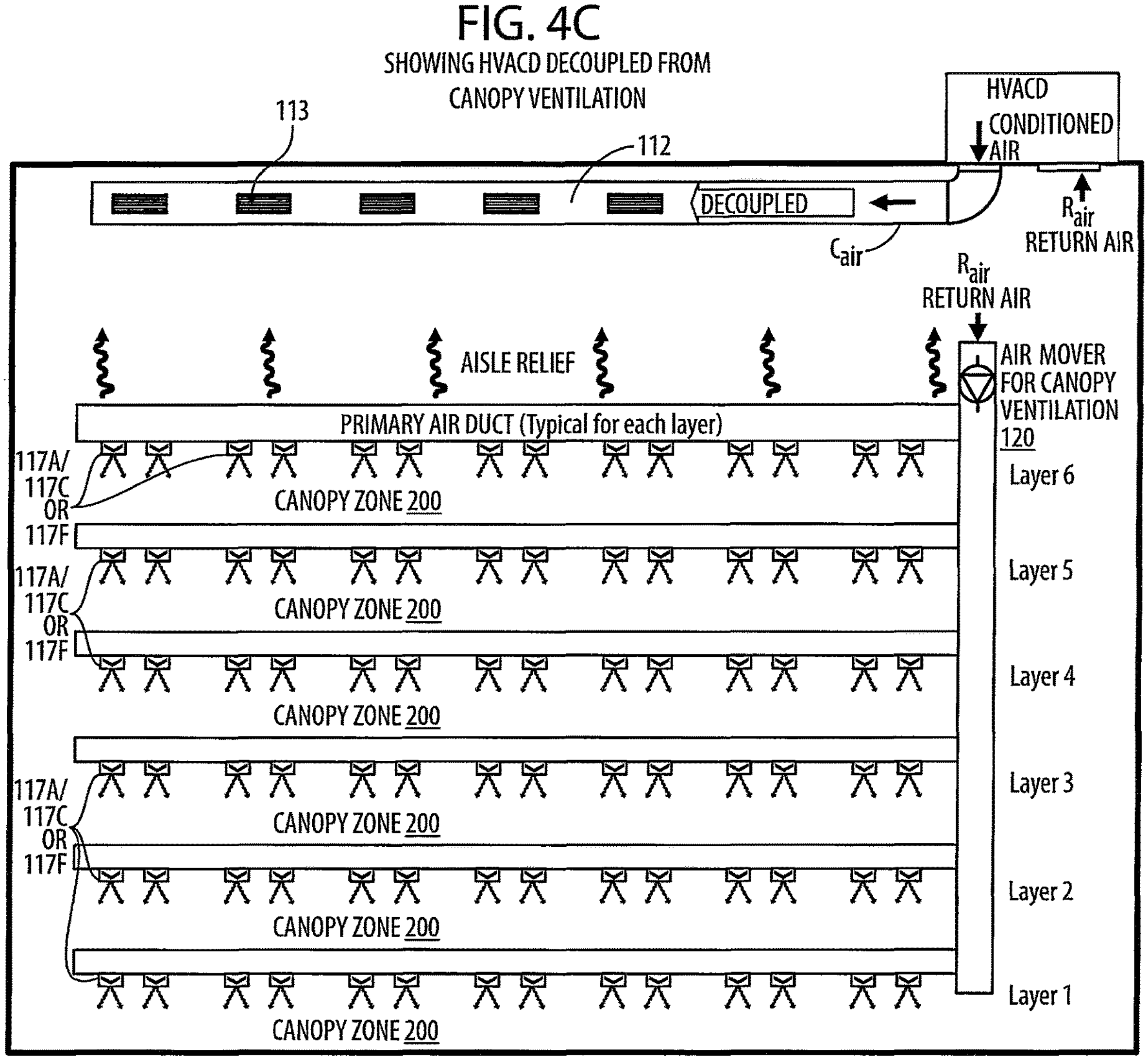
FIG. 4C is a diagrammatic view of the embodiment shown in FIG. 4A showing only the canopy ventilation system, decoupled from the HVACD system, with lighting, plants and other details outside to canopy ventilation system, omitted.

Also, for simplicity, FIG. 4C is a diagrammatic view of the embodiment shown in FIG. 4A showing only the canopy ventilation system, decoupled from the HVACD system, with lighting, plants and other details outside to canopy ventilation system, omitted.

FIG. 5 is an elevation view showing a preferred widthwise arrangement for the agricultural facility 100, in which the multiple cultivation layers shown in FIG. 4 are furthermore arranged into multiple cultivation rows. Merely to be exemplary, FIG. 5 shows four rows (i.e., Row 1, Row 2, Row 3, and Row 4). However, it is to be understood that other numbers of rows may be utilized, which other rows may also be formed in accordance with the structural arrangement described hereinafter. It is also noted that as used herein, the "width" direction need not be the lesser dimension of the facility and the "length" direction need not be the greater dimension of the facility.

Figure 6:
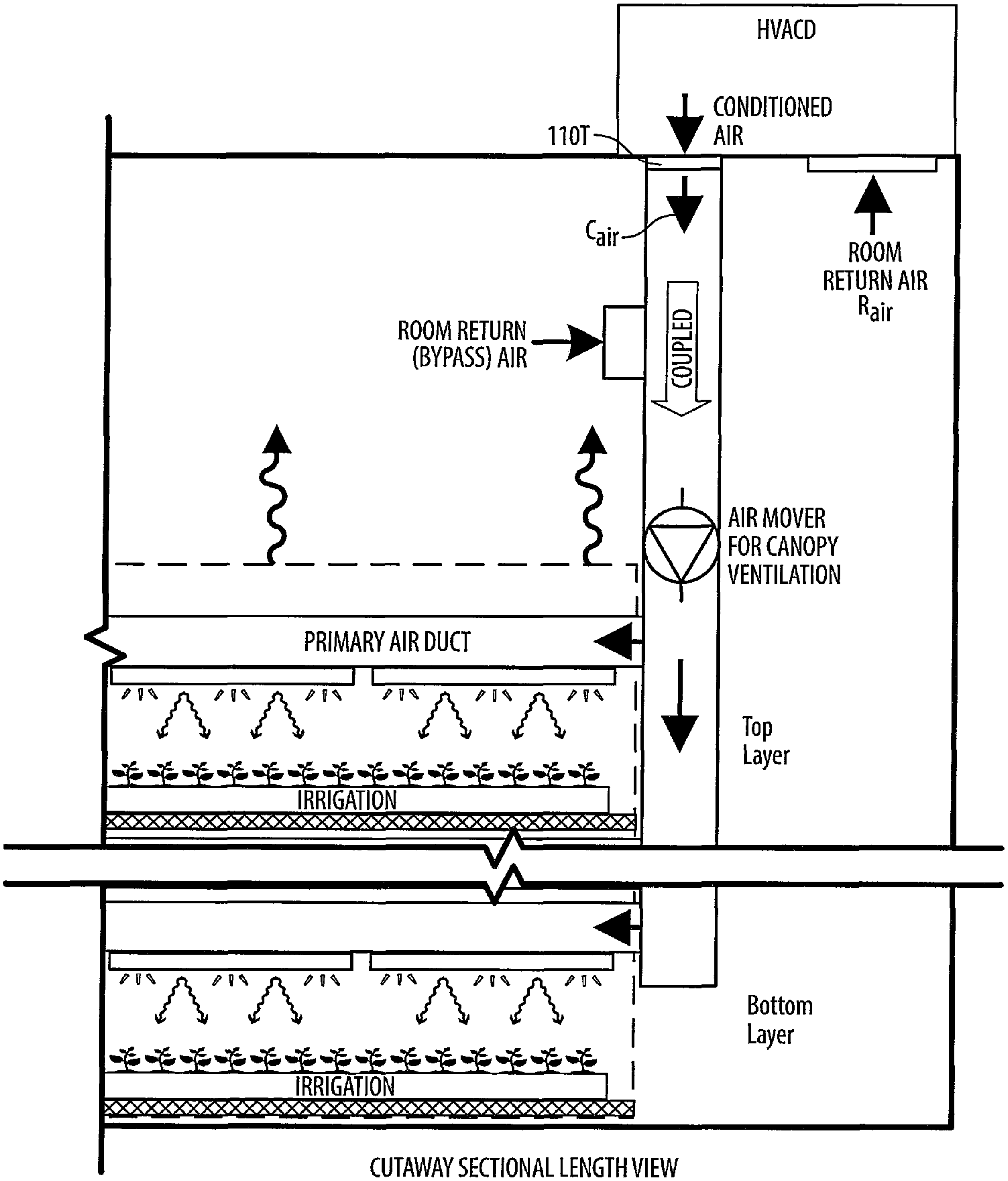
FIG. 6 shows a portion of the lengthwise arrangement of the cultivation room of FIG. 4, being shown enlarged, and showing the airflow and light being directed perpendicular to the plants and canopy.
Figure 7:
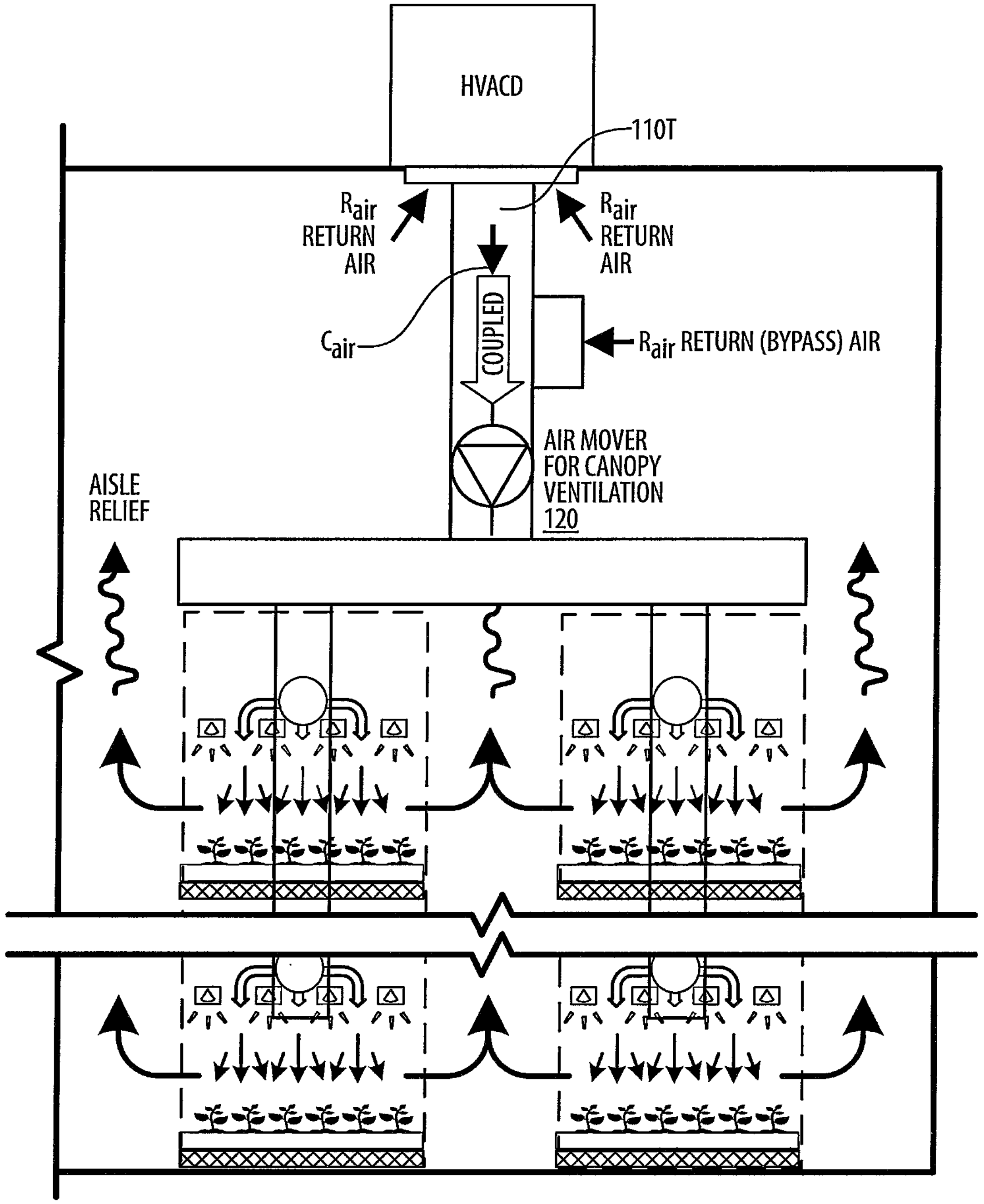
FIG. 7 shows a portion of the widthwise arrangement of the cultivation room of FIG. 5, being shown enlarged, and showing the airflow and light directed perpendicular to the plants and canopy.

FIG. 6 shows a portion of the lengthwise arrangement of the agricultural facility 100 of FIG. 4, being enlarged, while FIG. 7 shows a portion of the widthwise arrangement of the agricultural facility of FIG. 5, also being shown enlarged.

The agricultural facility 100 may have an enclosure 101 that may form a sealed and controlled environment for the layers and rows. The environment of the agricultural facility 100 within the enclosure 101 may be controlled by one Heating, Ventilating, Air Conditioning, and Dehumidification canopy ventilation system 200 that is configured to precisely control the temperature, humidity, and room vapor pressure (VP).

As may be seen in FIGS. 4 and 5, there may instead be one canopy ventilation system 200 for every two rows, or alternatively, there may be one canopy ventilation system 200 for each row (not shown), etc. Each canopy ventilation system 200 that is utilized may be positioned at an upper portion of the facility, and it may even be positioned outside of the enclosure 101, as seen in FIG. 4.

An HVACD system may maintain the temperature surrounding the canopy. Each HVACD system 110 may have a main inlet 110I, into which may be drawn the return air $R_{AIR}$, as described hereinafter. Each HVACD system 110 may additionally have an air outlet 110T (which is in fluid communication with at least one overhead duct 112, as noted above). An overhead supply air duct 112 may be positioned over the agricultural facility 100. Each duct 112 may be formed to include a plurality of spaced apart openings 113 to facilitate outflow of the supply air $C_{AIR}$ into the room 100 throughout the length of each layer. Each HVACD system 110 may deliver conditioned/controlled air $C_{AIR}$, to maintain room temperature, humidity, and room vapor pressure (VP). The conditioned/controlled air $C_{AIR}$ may be delivered from the HVACD system 110 to a primary air supply duct 112.

Each layer, as seen in FIG. 4, would have its own dedicated primary air supply duct. So, Layer 1 has a primary air supply duct 114Li; Layer 2 has primary air supply duct 114Lii; . . . ; and the last layer (e.g., Layer 6) would also have a dedicated primary air supply duct (e.g., primary air supply duct 114Lvi). Note that as seen at least in FIG. 4 and FIG. 5, a small amount of vertical relief (i.e., spacing) may be provided between the uppermost layer (e.g., Layer 6) and the overhead duct 113.

Figure 8:
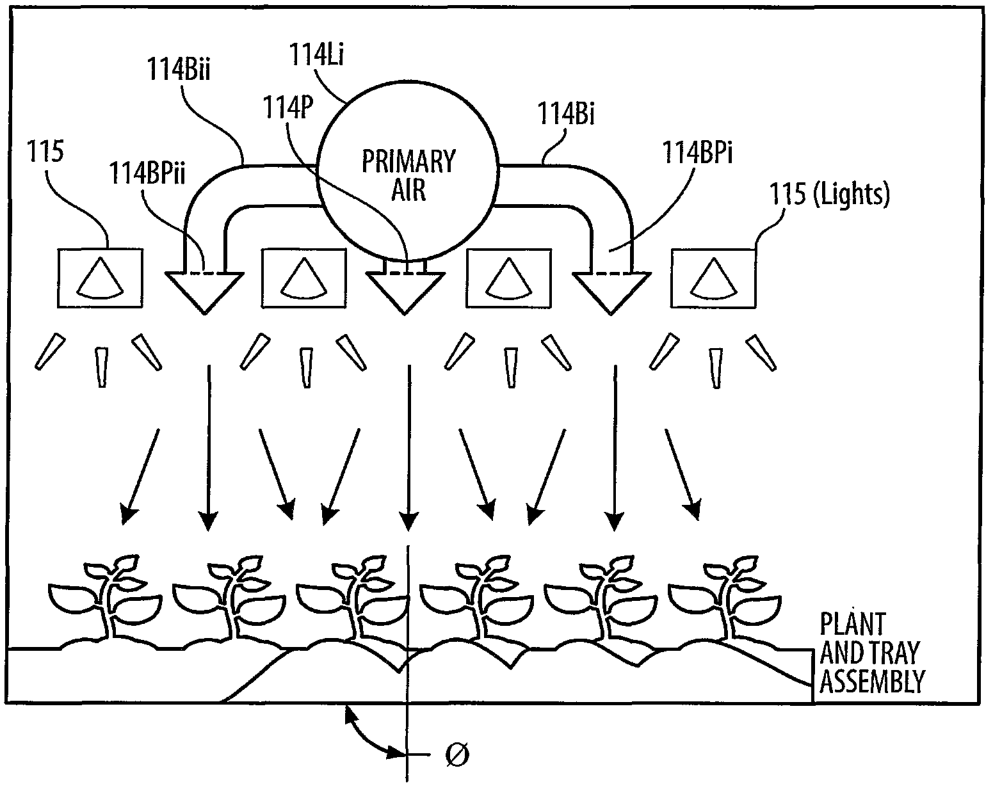
FIG. 8 is an enlarged detail view of one section of the plant/irrigation/lighting/air-mover assembly, a plurality of which may be used to form the arrangement of rows and layers shown in FIG. 4 and FIG. 5, which tray may contain a plurality of plants, with the view showing the novel localized plurality of supply air terminals and plurality of light sources, each configured to respectively direct the delivered air and the emitted light in a downward direction, being substantially perpendicular to the plants' canopy in the plant irrigation tray.

The delivery of the conditioned/controlled air $C_{AIR}$ to each of the trays underlying the respective primary air supply duct may be seen in the enlarged views of FIG. 6 and FIG. 7, and also in FIG. 8.

Figure 13:
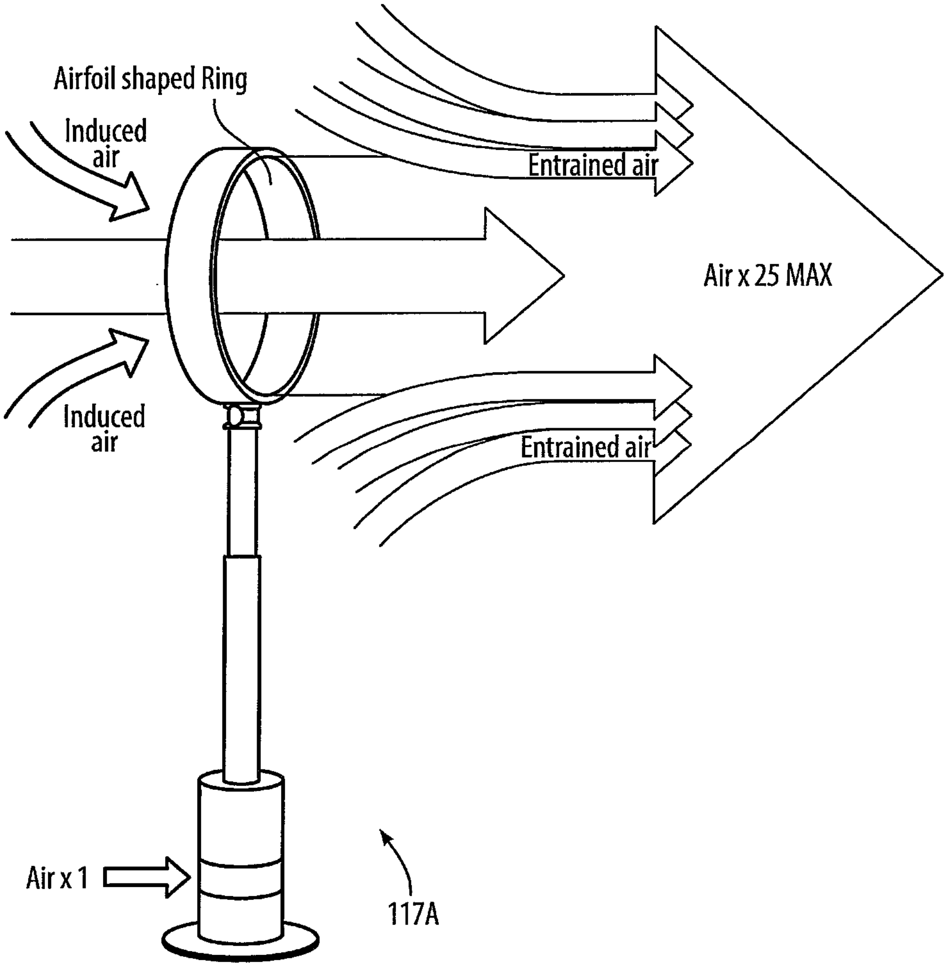
FIG. 13 shows an image of an airflow amplifier that uses a primary air volume to induce and entrain an air volume with up to twenty-five times greater air volume than the primary air volume.
Figure 14:
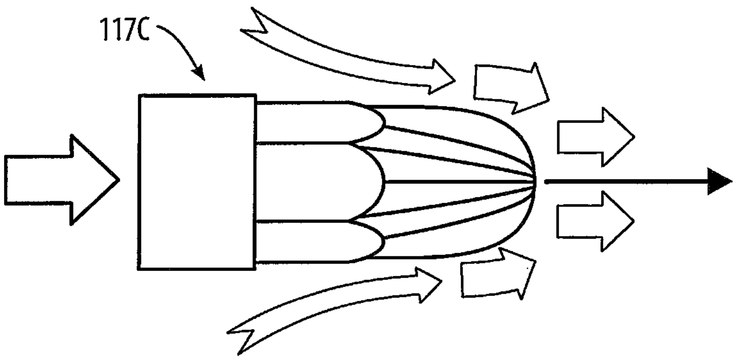
FIG. 14 shows an image of an airflow amplifier that uses a compressed primary air volume to induce and entrain an air volume with up to twenty-five times greater air volume than the primary air volume.
Figure 15:
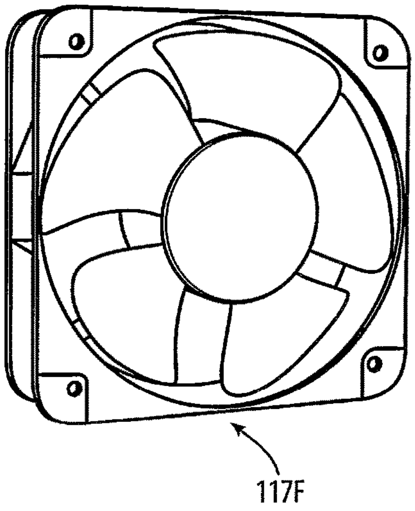
FIG. 15 shows a typical electric-driven air-mover, such as a muffin or pancake fan.
Figure 16:
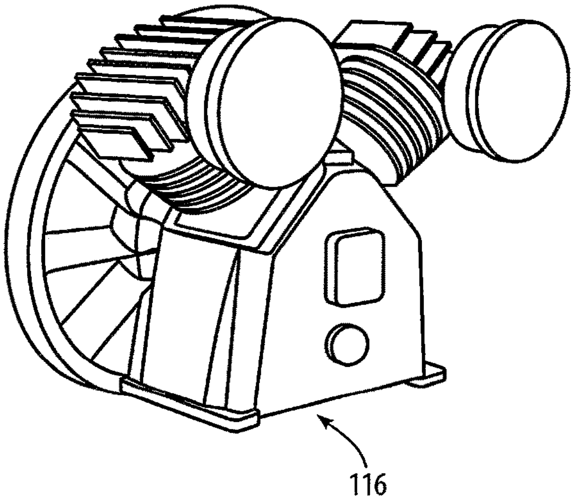
FIG. 16 shows an air compressor.
Figure 17:
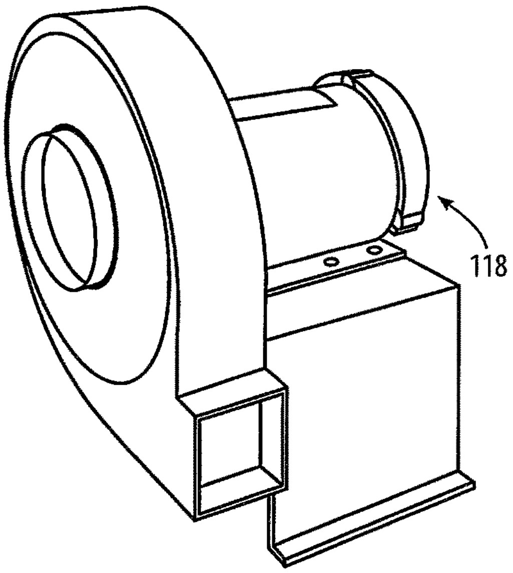
FIG. 17 shows a high-pressure blower.
Figure 18:
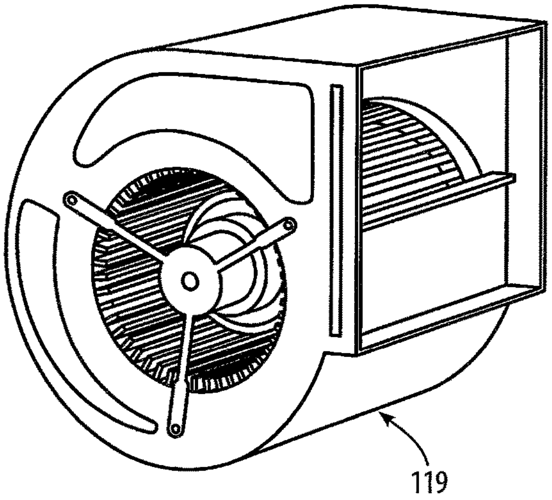
FIG. 18 shows a low-pressure blower.

As seen in FIG. 6 (and FIG. 4A) at least one air mover device 120 may be positioned at an upstream location in the main duct (e.g., just after the outlet 110T of the HVACD 110). The air mover device 120 may be any one or more of: the air compressor 116 shown in FIG. 16, the high-pressure blower 118 shown in FIG. 17, the low-pressure blower 119 shown in FIG. 18, etc. An airflow amplifier 117A, as seen in FIG. 13, or a compressed-air-driven airflow amplifier 117C, as seen in FIG. 14, may also be utilized to act upon the primary airstream in the duct to generate a secondary air volume up to twenty-five times greater than the primary airstream volume. Note that the induced air seen at least within FIG. 13 may be derived from outside of the duct, and may be air contained within the cultivation room. Suitable airflow amplifiers are available commercially, including, but not limited to, the airflow amplifier 903 from Vortec, an ITW Company, located in Cincinnati, Ohio.

FIG. 8 is an enlarged detail view of one section (e.g., one tray) of the plant/irrigation/lighting/air-mover assembly, a plurality of which may be used to form the arrangement of rows and layers shown in FIG. 4, FIG. 4A, and FIG. 5, which tray may contain a plurality of plants 98. As seen in FIG. 8, each primary air duct (e.g., 114Li) may be formed with a central terminus 114P, and two or more side branches (e.g., 114Bi, 114Bii, etc.), each of which branches may terminate in a respective terminus (e.g., 114Bpi, 114BPii, etc.). The central terminus 114P and terminus' of the side branches (e.g., 114Bpi, 114BPii, etc.) are configured to respectively direct the delivered air in a downward direction, being substantially perpendicular to the plants and canopy in the plant irrigation tray such that the turbulence will disrupt the boundary layer on the plant leaves.

In one embodiment, the phrase "substantially perpendicular," in relation to the angle θ may be deemed to mean an angle θ that is ninety-degrees angle plus or minus about 15 degrees in each direction, and in another embodiment, the phrase "substantially perpendicular" may be deemed to mean a ninety degree angle plus or minus about 15 degrees in each direction, and in yet a further embodiment, the phrase "substantially perpendicular" may be deemed to mean a ninety degree angle plus or minus 5 degrees in each direction, and in yet a different embodiment, the phrase "substantially perpendicular" may be deemed to mean a ninety degree angle plus or minus 2 degrees in each direction. The number of branches utilized may be increased as necessary (i.e., is not limited to two), to facilitate any one of the above-noted embodiments and provide the requisite "substantially perpendicular" airflow (see e.g., FIG. 12B and FIG. 12C). Flow diverters may be used to achieve a particular angular spread of the air flows where fewer branches may be utilized. In yet another embodiment, rather than using separate large discrete branches with corresponding openings, the air may be delivered through a narrow screen assembly that may extend across each of the plants of the tray (e.g., across the width formed by each of the six plants 98 shown in FIG. 8), and may thus directly overlie each of the plants, and which screen assembly may have openings that may include flow straighteners, which flow straighteners may include, but are not limited to, small lengths of straws, as this may ensure ninety degree airflow.

As seen in FIG. 8, each section of the plant/irrigation/lighting/air-mover assembly may also have a plurality of light sources 115, each configured to respectively direct the emitted light in a downward direction, which emitted light may also be directed substantially perpendicular to the plants and canopy in the plant irrigation tray.

Figure 9:
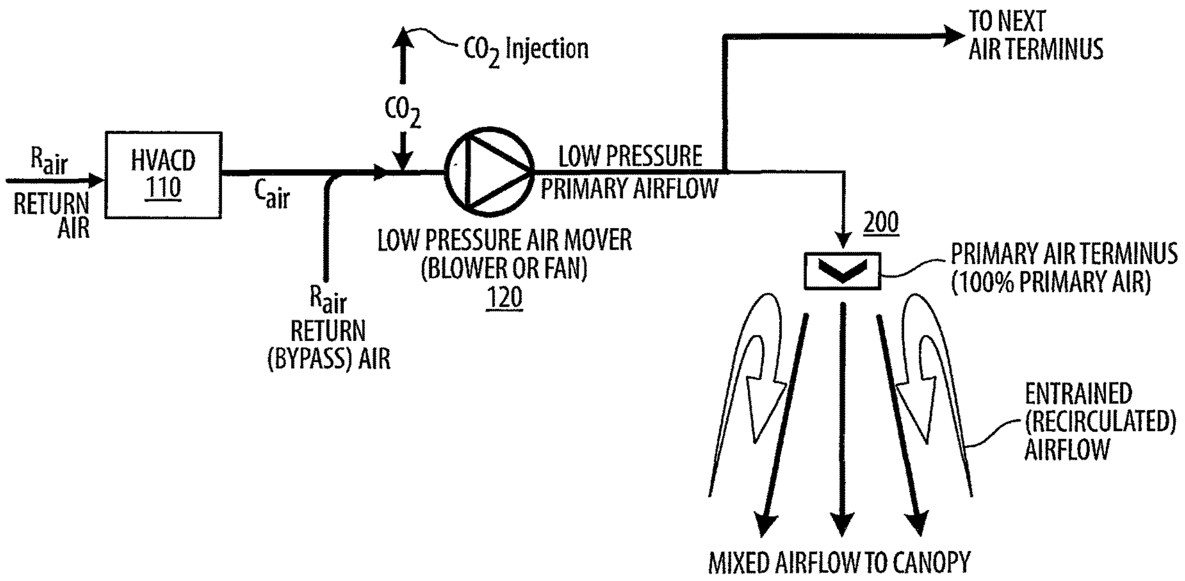
FIG. 9 is a block diagram showing a fan drawing air from the room (bypass air) and the HVACD unit and supplying primary air to one of a series of air outlets where the primary air velocity entrains a secondary airflow approximately equal to that of the primary airflow, creating a mixed airflow perpendicular to the plant canopy with optional $CO_2$ injection location, showing the flow of $CO_2$ at the fan inlet.

FIG. 9 is a block diagram showing an air mover that may be located at the air outlet of the HVACD unit, which may be the fan 117F (or one of the other air moving devices disclosed herein), thereby enhancing flow of the supply of primary air from a series of air outlets, where the primary air velocity entrains a secondary airflow approximately equal to that of the primary airflow, which may create a mixed airflow perpendicular to the plant canopy. FIG. 9 also shows, schematically, that an inlet port maybe configured to inject $CO_2$ at an upstream location, showing the inflow of $CO_2$ at or near the fan location. The addition of $CO_2$ from a source tank may serve to enhance, i.e., to increase, the rate of growth of the plants 98 in the agricultural facility 100. The amount of $CO_2$ injected into the port is necessarily coordinated with the extent to which nutrients are added to the soil and the water provided by the irrigation system, to be in optimal proportion for the particular crop(s) being cultivated, as too much of one of those, being excessive with respect to the others, would not increase growth as much as would otherwise be achieved.

Figure 10:
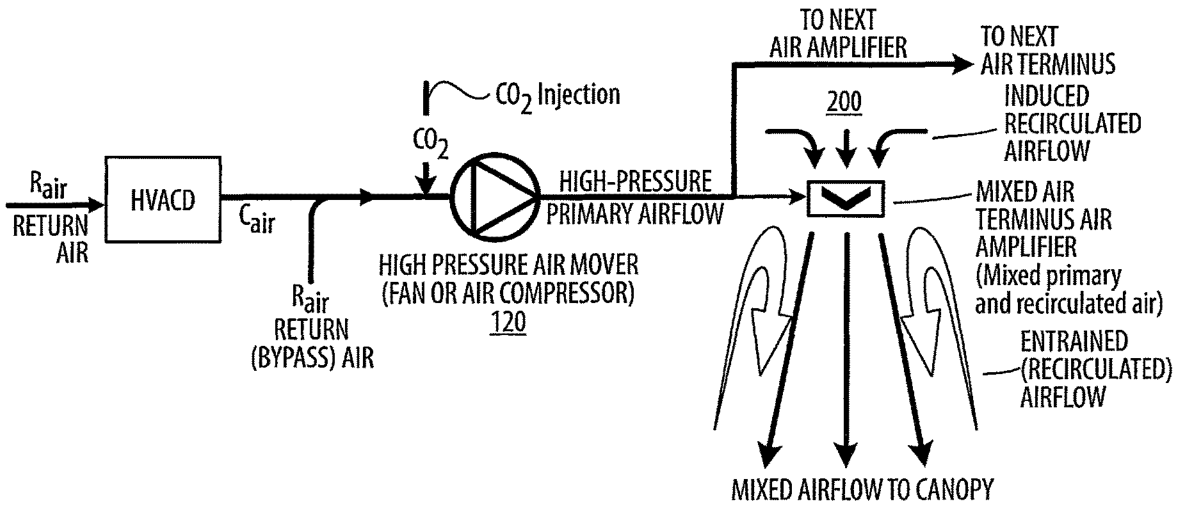
FIG. 10 is a block diagram showing a fan drawing air from the room (bypass air) and the HVACD unit and supplying primary air to one of a series of air amplifiers where the primary air velocity induces and entrains an airflow up to 25 times that of the primary airflow, and goes on, creating a mixed airflow perpendicular to the plant canopy with optional $CO_2$ injection location, showing the flow of $CO_2$ at the fan inlet.

FIG. 10 is a block diagram showing an air mover delivering primary air to a series of air amplifiers where the primary air velocity induces and entrains a secondary airflow up to 25 times that of the primary airflow creating a mixed airflow perpendicular to the plant canopy, with optional/periodic $CO_2$ injection, showing the flow of $CO_2$ at the fan inlet.

Figure 11:
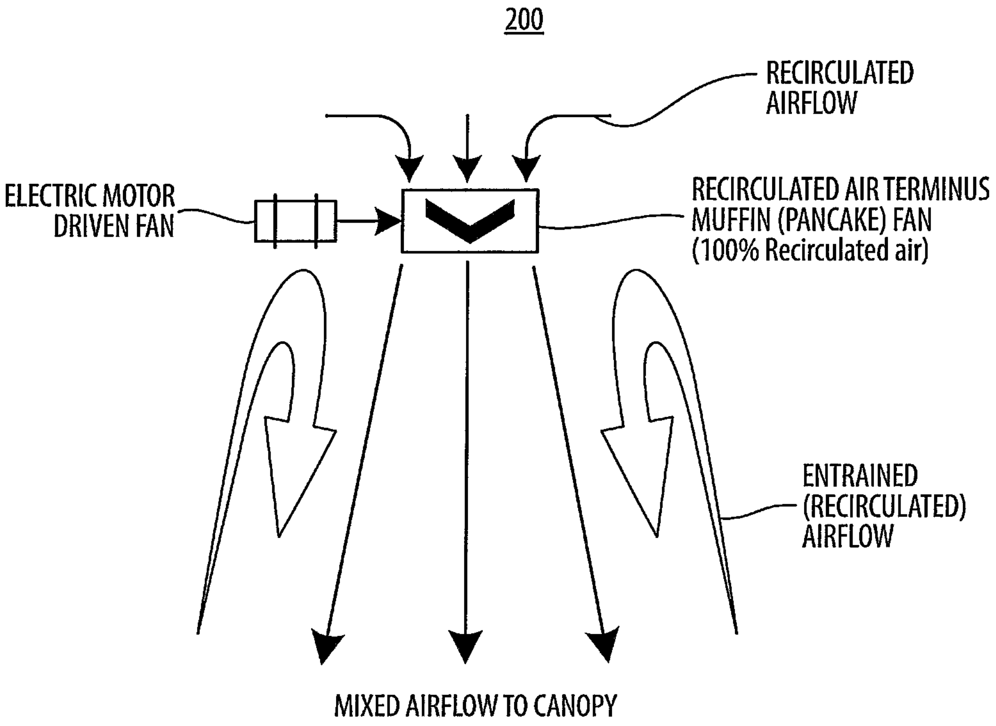
FIG. 11 is a block diagram showing one of a multitude of local "muffin" fans that recirculate 100% canopy air which is directed perpendicular to the canopy.

FIG. 11 shows that $CO_2$ may be injected from an inlet port, showing the inflow of $CO_2$ being at the fan inlet. FIG. 11 illustrates (schematically) that a pancake fan 117F may also be utilized proximate to each of the air outlets.

Figure 12A:
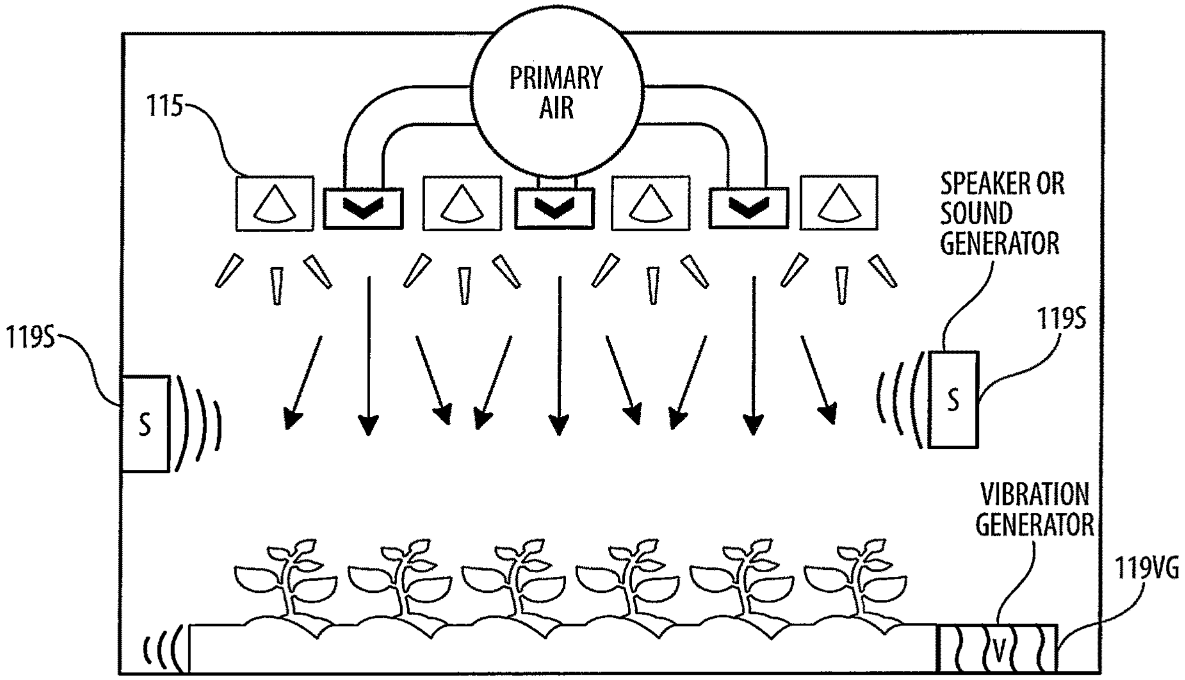
FIG. 12A is a diagrammatic view of a plant and tray assembly with lighting and two different apparatus types that operate to create vibrations at the plant's leaves, with one apparatus type being sound generating speakers and the other being a vibration generator, where the vibrations from either source type may serve to help break up boundary layers on the leaves.
Figure 12B:
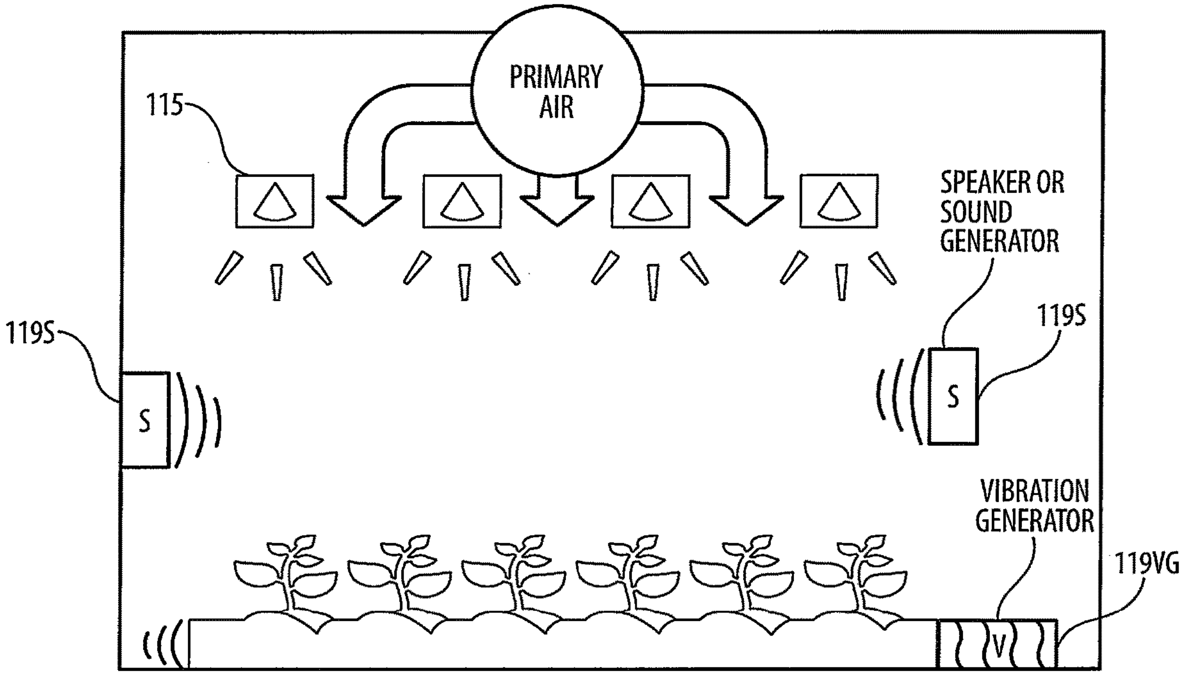
FIG. 12B is a diagrammatic view of a plant and tray assembly with lighting and two different apparatus types that operate to create vibrations at the plant's leaves as with FIG. 12A but where the sound generating speakers are intermingled between the light sources and the air flow outlets.

Since a boundary layer is essentially a microclimate that surrounds each leaf of each plant, and because it affects the speed at which heat, CO2, and water vapor are exchanged between the leaves and the surrounding air, and since a thicker boundary layer reduces this rate of transfer, vibrations are used in the agricultural facility 100. As shown in FIGS. 12A and 12B, the creation of vibrations using sound generating speakers and/or a vibration generator may serve to advantageously break up and reduce the boundary layers on the leaves, enabling growth that would otherwise have been hampered by a slower transfer rate.

Figure 12C:
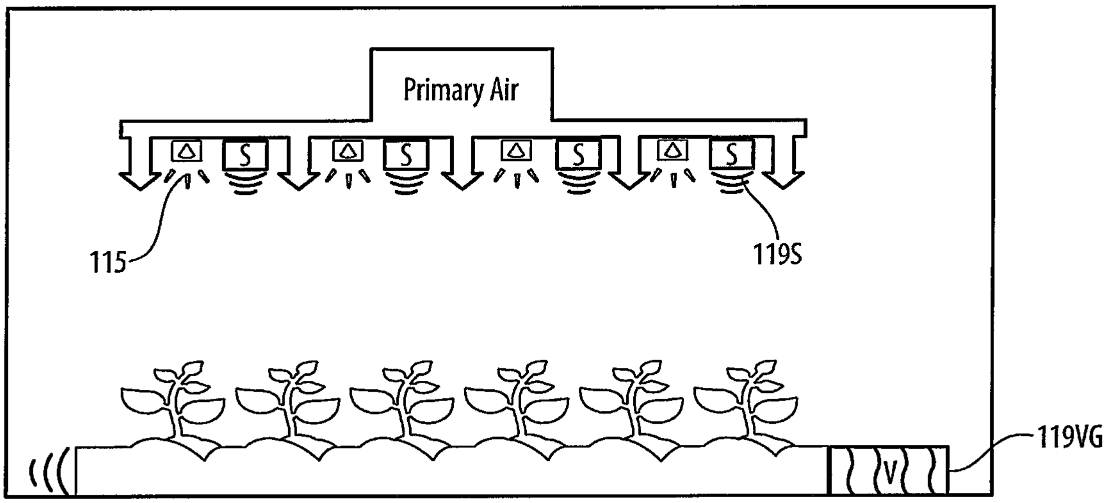
FIG. 12C is the diagrammatic view of FIG. 12B, but is shown with a different arrangement being indicative of possible three-dimensional mingling of the air outlets, lights, and sound generating speakers.

FIG. 12A is a diagrammatic view of a plant and tray assembly with lighting and showing two different apparatus types that operate to create vibrations at the plant's leaves, with one apparatus type being sound generating speakers 119S and the other being a vibration generator 119VG, where the vibrations from either source type serve to help break up (i.e., reduce) the boundary layers on the leaves. As seen in FIG. 12A, the sound generating speakers 119S may be positioned laterally to direct sound parallel to the plants, or alternatively, as seen in FIG. 12B and FIG. 12C, the speakers may be intermingled with the lights 115 and the air outlets to direct sound down at the plants. The sound generated may also be at around 432 hertz (Hz) as such sound may also promote plant growth by regulating the plant growth hormones indole-3-acetic acid (IAA) and gibberellin, and may also operate to enhance plant immunity against attacks by pathogens. The vibration generator 119VG may be attached to each tray (e.g., to one of its sides) or may be implanted within the soil contained within each tray, and may preferably be centered within the tray, which tray may be an elongated rectangular shape, or a square shape (although other shapes may also be used, e.g., a circular shape, an irregular shape, etc.).

FIG. 12B is another diagrammatic view of a different arrangement for the plant and tray assembly with lighting and vibration sources. As seen in FIG. 12B, the sound generating speakers 119S and the lights 115 may be mingled between the air outlets from the primary air duct, this the sound may also be directed towards the pants in the embodiment. As is shown in FIG. 12B, there may be one light source 115 and one sound generating speaker 119S between each pair of air outlets. However, other arrangements (i.e., other spacing configurations) are also contemplated. For example, the arrangement may be a succession of air outlet, light source 115, air outlet, sound generating speaker 119S, air outlet, etc. Moreover, it is further contemplated that the possible arrangements of air outlets, light sources 115, and speakers 119S may also be regularly distributed in two-dimensional space (i.e., along the length direction and the width direction of the tray assemblies of each layer), apart from the boundaries, and need not exhibit the one-dimensional linearity shown by the views of FIG. 12A, FIG. 12B, and FIG. 12C.

Figure 19:
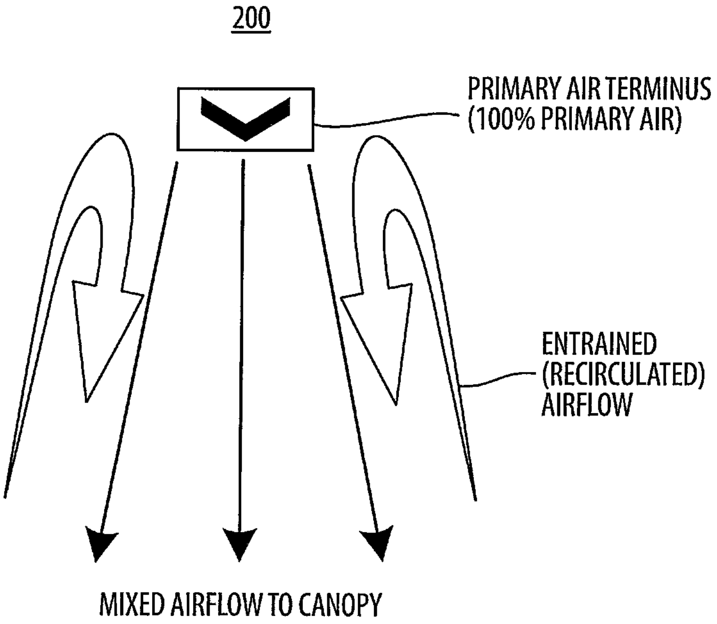
FIG. 19 shows a terminus airflow with 100% primary air supply

FIG. 19 shows a terminus airflow resulting from a volume of 100% primary air supply that exits the terminus, where it entrains another airstream from the canopy, resulting in a mixed airstream that is directed substantially perpendicular to the plant canopy.

Figure 20:
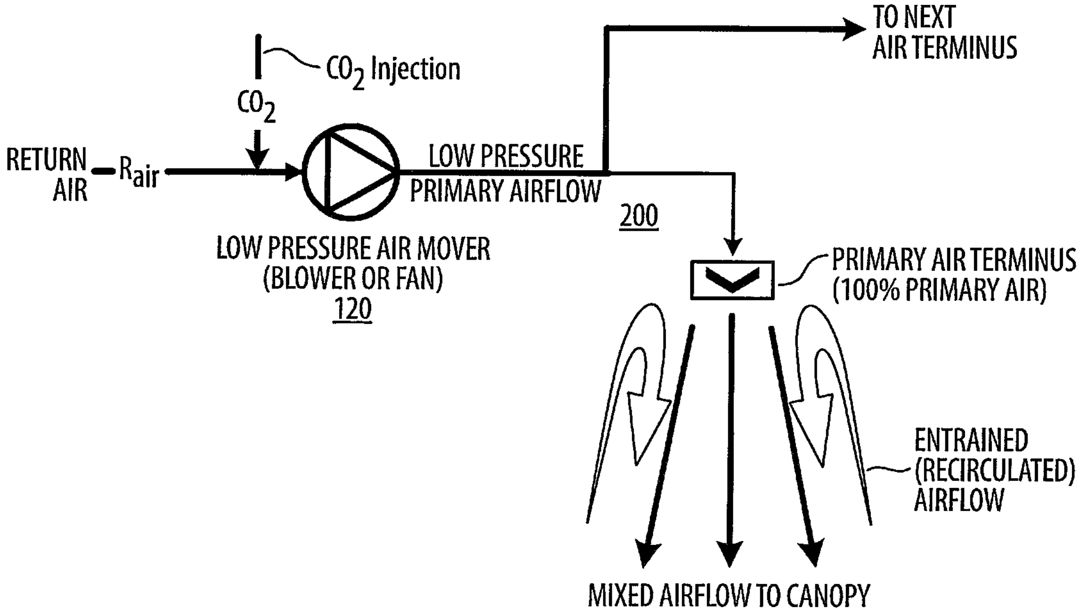
FIG. 20 shows the system serving the canopy ventilation system of FIG. 19.

FIG. 20 shows the canopy ventilation system of FIG. 19, driven by an air mover, that supplies 100% primary air from outside the canopy to each of a multitude of terminus, where the air velocity from each terminus creates an entrained air stream that mixes with the airstream exiting the terminus.

Figure 21:
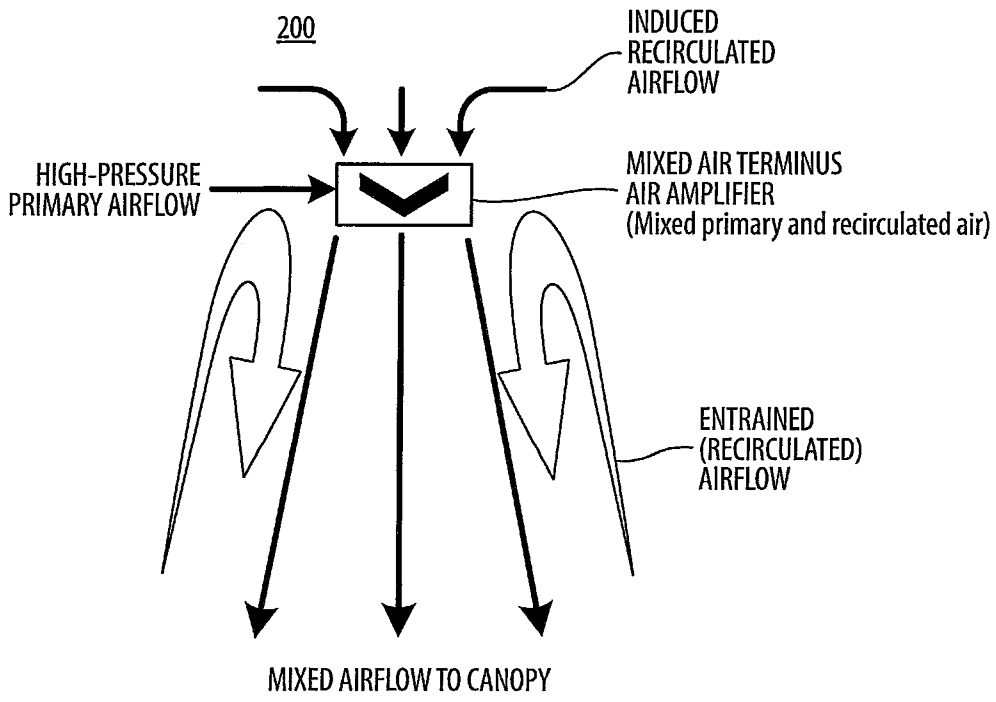
FIG. 21 shows an air amplifier terminus airflow resulting from a volume.

FIG. 21 shows a terminus airflow resulting from primary air feeding an airflow amplifier that creates an induced airstream that mixes with primary air and exits the terminus where it entrains another airstream from the canopy, resulting in a mixed airstream that is directed substantially perpendicular to the plant canopy.

Figure 22:
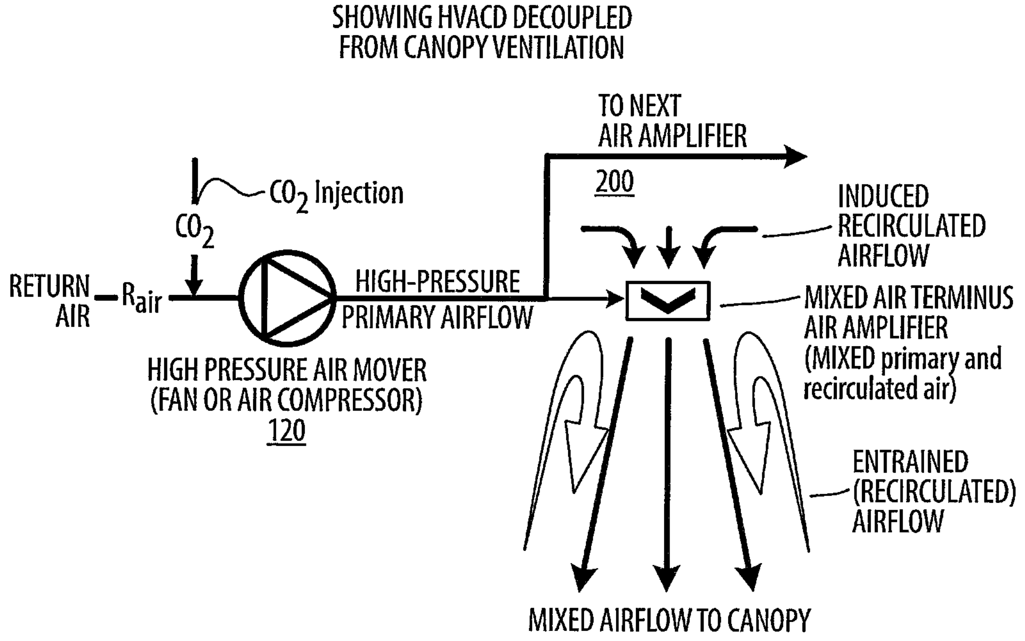
FIG. 22 shows the system serving the canopy ventilation system of FIG. 21.

FIG. 22 shows the canopy ventilation system of FIG. 21, driven by an air mover that supplies primary air from outside the canopy to each of a multitude of air amplifiers that induce an airstream that mixes with the primary air and exits the terminus where the air velocity entrains another air stream that mixes with the airstream exiting the terminus.

Figure 23:
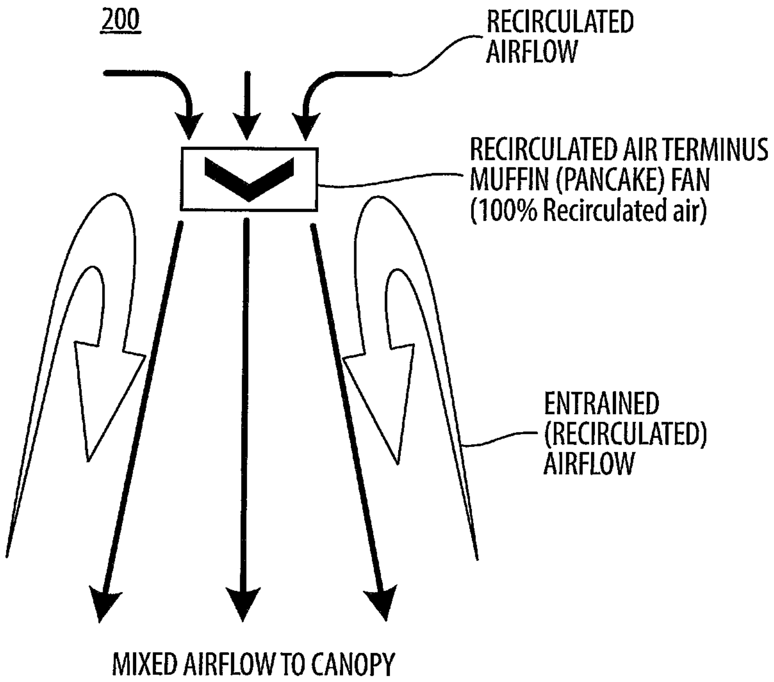
FIG. 23 shows a terminus airflow resulting from a 100% recirculated air.

FIG. 23 shows a terminus airflow resulting from a local air mover that moves 100% recirculated air that exits the terminus, where it entrains another airstream from the canopy, resulting in a mixed airstream that is directed substantially perpendicular to the plant canopy.

While illustrative implementations of one or more embodiments of the disclosed system are provided hereinabove, those skilled in the art and having the benefit of the present disclosure will appreciate that further embodiments may be implemented with various changes within the scope of the disclosed system. Other modifications, substitutions, omissions and changes may be made in the design, size, materials used or proportions, operating conditions, assembly sequence, or arrangement or positioning of elements and members of the exemplary embodiments without departing from the spirit of this invention.

Accordingly, the breadth and scope of the present disclosure should not be limited by any of the above-described example embodiments, but should be defined only in accordance with the following claims and their equivalents.

What is claimed is:

1. An apparatus for managing vapor pressure difference (VPD) in a controlled environment agricultural (CEA) facility comprising:

a canopy containing plant and tray assemblies including trays containing plants;

a plurality of light sources directed perpendicular to the plant and tray assemblies;

at least one primary air duct in communication with the plant and tray assemblies containing plants;

at least one air terminus of the at least one primary air duct is mingled with the plurality of light sources for directing airflow perpendicular toward the plant and tray assemblies;

an air conditioning system, the air conditioning system being configured to alter a temperature and a humidity of air received therein to create a conditioned air, at a desired temperature and a desired humidity level to compensate for losses and gains in the temperature and the humidity largely caused by the plurality of light sources and transpiration by the plants; and at least one air mover, the at least one air mover being configured to create a flow of the conditioned air directly from the air conditioning system to the at least one primary air duct;

wherein the at least one air mover and the air conditioning system are directly coupled;

wherein the at least one air mover comprises a dual-inlet plenum receiving a first stream of the conditioned air from the air conditioning system and a second stream of ambient air from within the CEA facility regulated so as to maintain a pre-determined canopy purge airflow and directed perpendicular to the canopy;

wherein the apparatus further comprises a controller configured to control a canopy-leaving air temperature and a vapor pressure, through the air conditioning system, to predetermined set-points; and wherein the at least one air mover is further configured to create airflow at a rate configured to directly ventilate an entire canopy of the plants by intermittently using at least one of:

the conditioned air from the air conditioning system; or the ambient air contained within the CEA facility;

wherein the at least one air terminus is located between adjacent light sources of the plurality of light sources such that an open space between the plurality of light sources and the plants remains free of obstructions that cast shadows.

2. The apparatus of claim 1, wherein the plurality of light sources consists of an array of light bars facing the plant and tray assemblies.

3. The apparatus of claim 2, wherein the at least one air mover is selected from the group consisting of low pressure blowers, high pressure blowers, air compressors, and pancake fans with airflow directed downwardly and perpendicular to the plant and tray assemblies.

4. The apparatus of claim 3, wherein the at least one air terminus is located between adjacent light bars.

5. The apparatus of claim 4, wherein the at least one air terminus promotes turbulence and air volume that is needed for avoiding hot spots on plant leaves.

6. The apparatus of claim 5, wherein the at least one air terminus is configured to amplify primary airflow by at least 5, and up to 25 times, when driven by compressed air, an air amplifier being configured to mix the primary air with locally induced and entrained canopy air to achieve canopy purge velocity at reduced duct cross-sections routed within a light-tray interstice.

7. The apparatus of claim 4 having means to inject $CO_2$ into air being directed downwardly toward the plant and tray assemblies.

8. The apparatus of claim 4, wherein the plurality of light sources and the at least one air terminus are arranged in a repeating two-dimensional pattern in both a first linear direction and a second linear direction perpendicular to the first linear direction across each layer of plants in the CEA facility.

9. The apparatus of claim 5, wherein leaf-surface temperature variation across the canopy of each tray is no more than −2° C. at steady-state operation.

10. The apparatus of claim 6, wherein the open space between the plurality of light sources and plants is maintained free of any objects which interfere with photosynthesis.

11. The apparatus of claim 1 wherein air is delivered perpendicular to the canopy from at least one of the group consisting of:

an air amplifier driven by high-pressure primary air;

an air outlet driven by low-pressure primary air; and, a flat cabinet or a muffin type fan, driven by electric power with no primary air wherein the flat cabinet or the muffin type fan recirculate canopy air when the air amplifier or the air outlet cannot maintain canopy purge.

12. The apparatus of claim 1 further comprising the at least one air mover having increased air volume capable of moving room air (Rair) into the canopy, the increased air volume to compensate when a primary airflow from the air conditioning system is insufficient to maintain a needed canopy air velocity to penetrate the foliage, and greater flow of air to the canopy is needed for ventilating the canopy.

13. An apparatus for managing vapor pressure difference (VPD) in a controlled environment agricultural facility (CEA) comprising:

a canopy containing plant and tray assemblies including trays containing plants;

a plurality of light sources is positioned directly above the plant and tray assemblies;

at least one primary air duct in communication with the plant and tray assemblies containing plants;

an air conditioning system, the air conditioning system being configured to alter a temperature and a humidity of air received therein to create a conditioned air, at a desired temperature and a desired humidity level to compensate for losses and gains in the temperature and the humidity largely caused by the plurality of light sources and transpiration by the plants;

at least one air terminus of the at least one primary air duct is mingled with the plurality of light sources for directing airflow downwardly and perpendicular toward the plant and tray assemblies;

at least one air mover, the at least one air mover being configured to create a flow of air directly from the air conditioning system to the at least one primary air duct;

wherein the at least one air mover and the air conditioning system are directly coupled;

wherein the at least one air mover is positioned downstream of an outlet of the air conditioning system and upstream of the at least one primary air duct;

wherein the at least one air mover comprises a dual-inlet plenum receiving a first stream of conditioned air from the air conditioning system and a second stream of ambient air from within the CEA facility regulated to maintain a pre-determined canopy purge airflow and directed perpendicular to the canopy;

wherein the apparatus further comprises a controller configured to control a canopy-leaving air temperature and a vapor pressure, through the air conditioning system, to predetermined set points;

wherein the at least one air mover is further configured to create airflow at a rate configured to directly ventilate an entire canopy of the plants by intermittently using at least one of:

the conditioned air from the air conditioning system; or the ambient air contained within the CEA facility; and wherein the apparatus further comprises one or more sound-generating speakers positioned in or between spaces between adjacent light sources of the plurality of light sources and canopy-facing at least one air terminus and directed toward the canopy and configured to disrupt leaf boundary layers to regulate VPD.

14. The apparatus of claim 13, wherein the at least one air terminus is strategically placed between the plurality of light sources.

15. The apparatus of claim 14, wherein the plurality of light sources consists of an array of light bars facing the plant and tray assemblies.

16. The apparatus of claim 15, wherein the at least one air terminus is located between adjacent light bars.

17. The apparatus of claim 16, wherein the at least one air terminus promotes turbulence and air volume that is needed for avoiding hot spots on plant leaves.

18. The apparatus of claim 16, wherein open space between the array of light bars and plants is maintained free of any objects which could cast shadows or interfere with photosynthesis.

19. The apparatus of claim 18, wherein the at least one air terminus is strategically placed between the plurality of light sources.

20. The apparatus of claim 13, wherein the at least one air mover is selected from the group consisting of low pressure blowers, high pressure blowers, air compressors, and pancake fans with airflow directed downwardly and perpendicular to the plant and tray assemblies.

21. The apparatus of claim 20, wherein the at least one air terminus is configured to amplify primary airflow by at least 5, and up to 25 times, when driven by compressed air, an air amplifier being configured to mix primary air with locally induced and entrained canopy air to achieve canopy purge velocity at reduced duct cross-sections routed within a light-tray interstice.

22. The apparatus of claim 13 wherein air is delivered perpendicular to the canopy from at least one of the group consisting of:

an air amplifier driven by high-pressure primary air;

an air outlet driven by low-pressure primary air; and, a flat cabinet or a muffin type fan, driven by electric power with no primary air.

23. The apparatus of claim 13 further comprising the at least one air mover having increased air volume capable of moving room air (Rair) into the canopy, when a primary airflow from the air conditioning system is insufficient to maintain a canopy velocity and a greater flow of air to the canopy is needed for ventilating the canopy.

24. The apparatus of claim 13, wherein the sound generators operate at a frequency sweep between 300-900 Hz.

25. A controlled environment agricultural (CEA) facility comprising:

a plurality of tray assemblies each configured to hold one or more plants to be cultivated;

wherein at least a portion of the plurality of tray assemblies are arranged to form a first layer configured to extend in a first linear direction;

wherein a second portion of the plurality of tray assemblies are formed into a plurality of additional layers, being spaced apart in the vertical direction and positioned above the first layer;

a plurality of light sources positioned directly above each of the plurality of tray assemblies, being configured to illuminate the plants in the plurality of tray assemblies;

at least one primary air duct for the first layer and for each of the plurality of additional layers;

wherein the at least one primary air duct comprises a plurality of distributed openings configured to direct air perpendicularly towards the plants in the plurality of tray assemblies;

an air conditioning system, the air conditioning system being configured to alter a temperature and a humidity of air received therein to create a conditioned air at a desired temperature and a desired humidity level to compensate for losses and gains in the temperature and the humidity largely caused by the plurality of light sources, and transpiration by the plants;

at least one air mover, the at least one air mover being configured to create a flow of the conditioned air directly from the air conditioning system to the at least one primary air duct;

wherein the at least one air mover and the air conditioning system are directly coupled;

wherein the at least one air mover is positioned downstream of an outlet of the air conditioning system and upstream of the at least one primary air duct;

wherein the at least one air mover comprises a dual-inlet plenum receiving a regulated first stream of the conditioned air from the air conditioning system and a regulated second stream of ambient air from within the CEA facility;

wherein the apparatus further comprises a controller configured to control canopy leaving air temperature and vapor pressure, through the air conditioning system, to predetermined set points; wherein the at least one air mover is further configured to create the airflow at a rate configured to directly ventilate an entire canopy of the plants by intermittently using at least one:

the conditioned air from the air conditioning system; or the ambient air contained within the CEA facility;

wherein the plurality of distributed openings in the at least one primary air duct are intermingled with the plurality of light sources in two dimensions with respect to said first linear direction and a second linear direction, said second linear direction being perpendicular to said first linear direction such that for each layer, each canopy for each tray receives perpendicular flow from an opening located between adjacent light bars in both directions with inter-light open volume remaining unobstructed;

wherein primary air ducts are sized for high-velocity primary air routing within structural members supporting the layers, with total canopy purge flow achieved by local air induction and entrainment at terminuses to minimize large low-pressure duct sizes.

26. The CEA facility of claim 25 further comprising: a plurality of sound speakers mingled with the plurality of distributed openings and the plurality of light sources; and wherein each of the plurality of sound speakers are configured to output sound to create vibrations to break up and reduce boundary layers on the leaves of the plants.

27. The CEA facility of claim 26 further comprising:

at least one vibration generator positioned with respect to each of the plurality of tray assemblies; and wherein each of the at least one vibration generator is configured to create vibrations to break up and reduce boundary layers on the leaves of the plants.

28. The CEA facility of claim 27, wherein the at least one vibration generator is centrally positioned within the plurality of tray assemblies; and wherein each of the at least one vibration generator is secured to the plurality of tray, the vibration generators being configured to transmit mechanical vibration uniformly across tray surfaces.

29. The CEA facility of claim 28, wherein the plurality of distributed openings, the plurality of light sources, and the plurality of sound speakers are regularly distributed above the plurality of tray assemblies of each layer, being regularly distributed with respect to said first linear direction and said second linear direction.

30. The CEA facility of claim 29, further comprising: a tank of $CO_2$; and means for injecting a desired amount of $CO_2$ into the conditioned air from the air conditioning system.

31. The CEA facility of claim 30, wherein the sound is at 432 hertz; and wherein the at least one air mover is one or more of: a low-pressure blower, a high-pressure blower, and an air compressor.

32. The CEA facility of claim 2 further comprising the at least one air mover having increased air volume capable of moving room air (Rair) into the canopy, when a primary airflow from the air conditioning system is insufficient to maintain a canopy velocity and a greater flow of air to the canopy is needed for ventilating the canopy.

33. The CEA facility of claim 25 wherein air is delivered perpendicular to the canopy from at least one of the group consisting of: an air amplifier driven by high-pressure primary air; an air outlet driven by low-pressure primary air; and, a flat cabinet or a muffin type fan, driven by electric power with no primary air.

34. An apparatus for managing vapor pressure difference (VPD) in a controlled environment agricultural facility (CEA) comprising:

a canopy containing plant and tray assemblies including trays containing plants;

a plurality of light sources is positioned directly above the plant and tray assemblies;

at least one primary air duct in communication with the plant and tray assemblies containing plants;

an air conditioning system, the air conditioning system being configured to alter a temperature and a humidity of air received therein to create a conditioned air, at a desired temperature and a desired humidity level to compensate for losses and gains in the temperature and the humidity largely caused by the plurality of light sources and transpiration by the plants;

at least one air terminus of the at least one primary air duct is mingled with the plurality of light sources for directing airflow downwardly and perpendicular toward the plant and tray assemblies;

at least one air mover, the at least one air mover being configured to create a flow of air directly from the air conditioning system to the at least one primary air duct;

wherein the at least one air mover and the air conditioning system are directly coupled;

wherein the at least one air mover is positioned downstream of an outlet of the air conditioning system and upstream of the at least one primary air duct;

wherein the at least one air mover comprises a dual-inlet plenum receiving a first stream of conditioned air from the air conditioning system and a second stream of ambient air from within the CEA facility regulated to maintain a pre-determined canopy purge airflow and directed perpendicular to the canopy;

wherein the apparatus further comprises a controller configured to control a canopy-leaving air temperature and a vapor pressure, through the air conditioning system, to predetermined set points;

wherein the at least one air mover is further configured to create airflow at a rate configured to directly ventilate an entire canopy of the plants by intermittently using at least one of:

the conditioned air from the air conditioning system; or the ambient air contained within the CEA facility; and wherein the apparatus further comprises one or more vibration generators mechanically coupled to the trays to transmit vibration to leaves and configured to disrupt leaf boundary layers to regulate VPD.

* * * * *